US009294663B2

(12) United States Patent
Arai

(10) Patent No.: US 9,294,663 B2
(45) Date of Patent: Mar. 22, 2016

(54) IMAGING APPARATUS AND IMAGING METHOD FOR GENERATING INCREASED RESOLUTION IMAGES, HYPERSPECTRAL IMAGES, STEROSCOPIC IMAGES, AND/OR REFOCUSED IMAGES

(71) Applicant: Sony Corporation, Tokyo (JP)

(72) Inventor: Hiroshi Arai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 14/252,039

(22) Filed: Apr. 14, 2014

(65) Prior Publication Data

US 2014/0333802 A1 Nov. 13, 2014

(30) Foreign Application Priority Data

May 8, 2013 (JP) ................................ 2013-098446

(51) Int. Cl.
| | | |
|---|---|---|
| H04N 13/02 | (2006.01) | |
| H04N 5/225 | (2006.01) | |
| H04N 5/357 | (2011.01) | |
| H04N 5/232 | (2006.01) | |
| H04N 5/228 | (2006.01) | |

(52) U.S. Cl.
CPC ......... *H04N 5/2258* (2013.01); *H04N 5/23232* (2013.01); *H04N 5/3572* (2013.01); *H04N 13/0203* (2013.01)

(58) Field of Classification Search
CPC ............................ H04N 5/357; H04N 5/3572
USPC .................. 348/42, 47, 222.1, 340, 369, 241; 382/255
See application file for complete search history.

(56) References Cited

U.S. PATENT DOCUMENTS

| 8,836,672 B2 * | 9/2014 | Stienstra et al. .............. 345/175 |
| 2003/0234907 A1 * | 12/2003 | Kawai ............................ 351/206 |
| 2004/0099787 A1 * | 5/2004 | Dolne et al. ................ 250/201.2 |
| 2013/0071041 A1 * | 3/2013 | Jin et al. ........................ 382/254 |
| 2013/0242138 A1 * | 9/2013 | Becker-Lakus et al. ...... 348/239 |

FOREIGN PATENT DOCUMENTS

| JP | 2001-521772 | 11/2001 |
| JP | 2008-219788 | 9/2008 |
| JP | 2009-181508 | 8/2009 |
| JP | 2009-224982 | 10/2009 |
| JP | 2013-012112 | 1/2013 |

* cited by examiner

*Primary Examiner* — Ngoc-Yen Vu
(74) *Attorney, Agent, or Firm* — Michael Best & Friedrich LLP

(57) ABSTRACT

An imaging apparatus includes an imaging unit and a transmission unit. The imaging unit is configured to capture two images that are different from each other by a predetermined amount of an optical distance (focus) between an objective lens and an imaging device having a first resolution. The transmission unit is configured to transmit the captured images.

9 Claims, 36 Drawing Sheets

Dispersed light is mixed with surrounding light to be seen white

White object

Moire pattern is slightly observed due to bias of spectral characteristics

When surface spectrum changes

IMAGING APPARATUS AND IMAGING METHOD FOR GENERATING INCREASED RESOLUTION IMAGES, HYPERSPECTRAL IMAGES, STEROSCOPIC IMAGES, AND/OR REFOCUSED IMAGES

CROSS REFERENCE TO RELATED APPLICATIONS

This application claims the benefit of Japanese Priority Patent Application JP 2013-098446 filed May 8, 2013, the entire contents of which are incorporated herein by reference.

BACKGROUND

The present disclosure relates to an imaging apparatus and an imaging method that achieve a high resolution image, a hyperspectral image, a stereoscopic image, and a refocused image based on two images with different focuses.

In order to achieve high resolution of images in related art, there is an enlargement technique in which upsampling is performed on the original image for enlargement and jaggies generated on the image due to the enlargement are smoothed using an appropriate filter.

Additionally, there is a super-resolution technique of interpolating lacking information between frames of a video, interpolating pseudo-pixels using a heuristics database, or showing an image in an ergonomically beautiful manner by increasing image information using an intelligent method (see, for example, Japanese Patent Application Laid-open No. 2009-181508).

Further, a technique of pixel shift is exemplified as a high resolution technique in which an imaging device with a certain resolution is used to capture an image with a resolution exceeding the resolution of the imaging device (see, for example, Japanese Patent Application Laid-open No. 2013-12112).

Further, a hyperspectral camera can capture an image including spectra of a lot of frequency bands in the range from visible light to near-infrared light (see, for example, Japanese Patent Application Laid-open No. 2001-521772)

Furthermore, a camera by an integral imaging method that is capable of vertically and horizontally moving a perspective is created as a subsequent step of a stereo 3D camera (see, for example, Japanese Patent Application Laid-open No. 2008-219788)

Moreover, a light field camera capable of generating an image whose focal position is freely changed (refocused) after the image is captured is created (see, for example, Japanese Patent Application Laid-open No. 2009-224982). Hereinafter, the image whose focal position is freely changed is referred to as a "refocused image".

SUMMARY

A camera has a basic function of three-color monochrome photography based on three primary colors of light. For example, in a frequency band of red light, the camera has difficulty of determining a difference in about 10 nm between different spectra. This is because, when the sum of luminance values of an R channel falls in a single luminance level, the luminance values are rounded in the same R channel.

Due to this rounding, it has been difficult to use a normal camera for an image analysis in a case where an analysis of a slight color difference is necessary, such as in medical use.

Additionally, as cameras to observe such information, a hyperspectral camera and a multispectral camera are in practical use. However, those cameras are hard to use because of performing only one-dimensional imaging at a time and performing imaging exclusively in a specific spectrum.

In the integral imaging method, lens arrays are used and thus there are problems that the resolution of captured images is poor and the data amount of the captured images becomes huge.

As described above, in the methods of related art, it has been difficult to easily acquire a high resolution image, a hyperspectral image, a stereoscopic image, and a refocused image.

In view of the circumstances as described above, it is desirable to provide an imaging apparatus and an imaging method that are capable of easily acquiring a high resolution image, a hyperspectral image, a stereoscopic image, and a refocused image.

According to an embodiment of the present disclosure, there is provided an imaging apparatus including an imaging unit and a transmission unit. The imaging unit is configured to capture two images that are different from each other by a predetermined amount of an optical distance (focus) between an objective lens and an imaging device having a first resolution. The transmission unit is configured to transmit the captured images.

In the embodiment of the present disclosure, in the imaging apparatus, two images that are different from each other by a predetermined amount of focus and have a first resolution are acquired and transmitted to the development apparatus.

In a development apparatus for a high resolution development, the angles of view of the two images are equalized, one of the two images being a first focus image and the other image being a second focus image. An image obtained by diffusing and enlarging the first focus image to have a second resolution higher than the first resolution is generated as a digital defocused image. Further, an image obtained by upsampling the second focus image at the second resolution is generated as an enlarged defocused image. Furthermore, a difference for each pixel between the digital defocused image and the enlarged defocused image is generated as an interference image. By a learning-type pattern conversion circuit, a high-frequency component of the second resolution is generated from the interference image, and component synthesis processing is performed with the first focus image being regarded as a low-frequency component, to develop an image having the second resolution.

In a development apparatus for a hyperspectral development, the angles of view of the two images are equalized, one of the two images being a first focus image and the other image being a second focus image. An image obtained by diffusing the first focus image is generated as a digital defocused image. A difference for each pixel between the digital defocused image and the second focus image is generated as an interference image. Through processing of emphasizing a magnification chromatic aberration by a learning-type pattern conversion circuit, a high-frequency component containing spectral information is generated from the interference image, and component synthesis processing of the first focus image and the high-frequency component is performed, to develop a hyperspectral image.

In a development apparatus for an image for stereoscopic viewing, the angles of view of the two images are equalized, one of the two images being a first focus image and the other image being a second focus image. An image obtained by diffusing the first focus image by a first function is generated as a first digital defocused image, and an image obtained by diffusing the first focus image by a second function is generated as a second digital defocused image, the first function and the second function being linearly symmetrical with each other. A difference for each pixel between the first digital defocused image and the second focus image is generated as first mask information, and a difference for each pixel between the second digital defocused image and the second focus image is generated as second mask information. A first image for stereoscopic viewing is developed from the first focus image and the first mask information, and a second image for stereoscopic viewing is developed from the first focus image and the second mask information.

In a development apparatus for a refocused image development, the first focus image and the second focus image are taken in and a difference for each pixel between the two images is generated as an interference image. By a learning-type pattern conversion circuit, a high-frequency component is generated from luminance information and spectral information of the interference image, and component synthesis processing of the first focus image and the high-frequency component is performed, to develop a refocused image.

Through the processing described above, in the present disclosure, it is possible to easily acquire a high resolution image, a hyperspectral image, a stereoscopic image, and a refocused image.

According to the embodiment of the present disclosure, in the imaging apparatus, the imaging unit may include a formed-image-capturing device configured to capture a formed image on which light passing through the objective lens is focused, and a defocused-image-capturing device configured to capture a defocused image on which the light is defocused based on the predetermined amount.

According to the embodiment of the present disclosure, the imaging apparatus may further include: an angle-of-view adjustment unit configured to equalize angles of view of the two images, one of the two images being a first focus image and the other image being a second focus image; a diffusion unit configured to generate, as a digital defocused image, an image obtained by diffusing and enlarging the first focus image to have a second resolution higher than the first resolution; an upsampling unit configured to generate, as an enlarged defocused image, an image obtained by upsampling the second focus image to have the second resolution; and a difference calculation unit configured to generate, as an interference image, a difference for each pixel between the digital defocused image and the enlarged defocused image, in which the transmission unit may be configured to transmit the first focus image and the interference image.

According to the embodiment of the present disclosure, in the imaging apparatus, the first focus image may be a formed image that is in focus, and the second focus image may be a defocused image that is defocused by a predetermined amount from the in-focus position.

According to the embodiment of the present disclosure, in the imaging apparatus, the diffusion unit may be configured to diffuse the formed image by a point spread function.

According to the embodiment of the present disclosure, the imaging apparatus may further include: an angle-of-view adjustment unit configured to equalize angles of view of the two images, one of the two images being a first focus image and the other image being a second focus image; a diffusion unit configured to generate, as a digital defocused image, an image obtained by diffusing the first focus image; and a difference calculation unit configured to generate, as an interference image, a difference for each pixel between the digital defocused image and the second focus image, in which the transmission unit may be configured to transmit the first focus image and the interference image.

According to the embodiment of the present disclosure, the imaging apparatus may further include: an angle-of-view adjustment unit configured to equalize angles of view of the two images, one of the two images being a first focus image and the other image being a second focus image; a diffusion unit configured to generate, as a first digital defocused image, an image obtained by diffusing the first focus image by a first function and generate, as a second digital defocused image, an image obtained by diffusing the first focus image by a second function, the first function and the second function being linearly symmetrical with each other; and a difference calculation unit configured to generate, as first mask information, a difference for each pixel between the first digital defocused image and the second focus image and generate, as second mask information, a difference for each pixel between the second digital defocused image and the second focus image, in which the transmission unit may be configured to transmit the first focus image, the first mask information, and the second mask information.

According to the embodiment of the present disclosure, the imaging apparatus may further include: an angle-of-view adjustment unit configured to equalize angles of view of the two images, one of the two images being a first focus image and the other image being a second focus image; and a difference calculation unit configured to generate, as an interference image, a difference for each pixel between the first focus image and the second focus image, in which the transmission unit may be configured to transmit the first focus image, the second focus image, and the interference image.

According to an embodiment of the present disclosure, there is provided an imaging apparatus including: an imaging unit configured to capture an image; a correction unit configured to perform at least one of an aberration correction and a digital optical correction on the image to generate a corrected image; a difference calculation unit configured to generate, as an interference image, a difference for each pixel between the image and the corrected image; and a transmission unit configured to transmit coordinate information contained in the image, the interference image, and the corrected image.

According to an embodiment of the present disclosure, there is provided an imaging method including: capturing two images that are different from each other by a predetermined amount of an optical distance (focus) between an objective lens and an imaging device; and transmitting the captured images.

As described above, according to the present disclosure, it is possible to easily acquire a high resolution image, a hyperspectral image, a stereoscopic image, and a refocused image.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.
First Embodiment
First, the overall configuration will be described. Subsequently, the general outline of a technique of achieving high resolution of an image according to an embodiment of the present disclosure (hereinafter, referred to as high resolution development) will be described. Finally, specific examples will be described.

It should be noted that the high resolution development according to the embodiment of the present disclosure is for collecting interference information of light from two images whose focal points are shifted on the same optical axis and developing an image with a resolution higher than a resolution of an imaging device based on the interference information.

[Overall Configuration]

Figure 1:
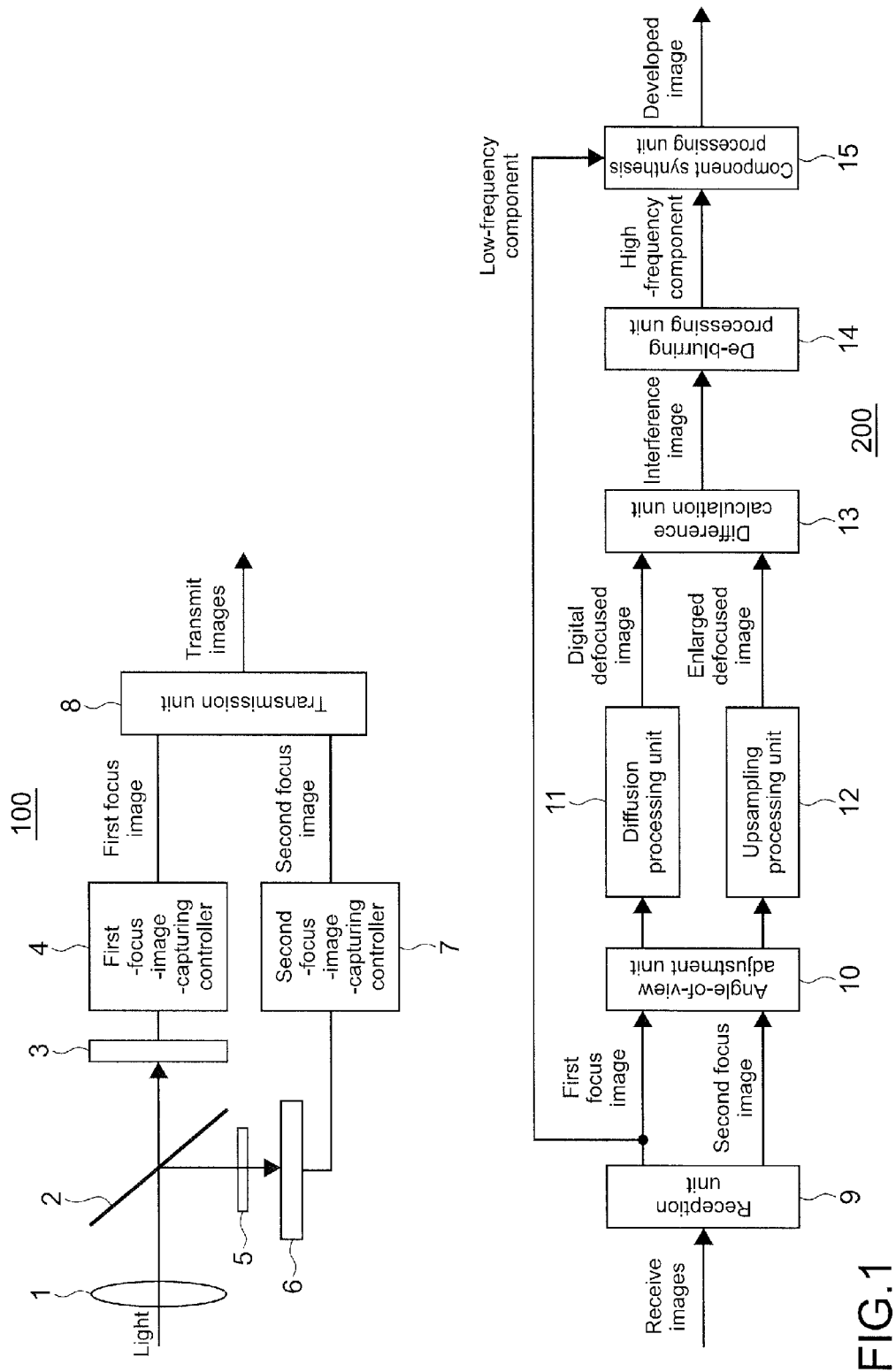
FIG. 1 is a configuration diagram showing an overall configuration of an imaging apparatus and a development apparatus according to an embodiment of the present disclosure.

First, the overall configuration of an imaging apparatus and a development apparatus according to the embodiment of the present disclosure will be described. FIG. 1 is a configuration diagram showing an overall configuration of an imaging apparatus 100 and a development apparatus 200 according to the embodiment of the present disclosure. It should be noted that the terms used below, i.e., a "first focus" and a "second focus", typically refer to a focus in an in-focus state and a focus defocused from the focus in the in-focus state by a predetermined amount. In this case, a "first focus image" can be read as a "formed image" and a "second focus image" can be read as a "defocused image".

However, the focuses represented by the "first focus" and the "second focus" are not limited to the above. A focus that is defocused from the focus in the in-focus state to a subject side by a predetermined amount may be referred to as a "first focus", and a focus that is defocused from the focus in the in-focus state to an image plane side by a predetermined amount may be referred to as a "second focus".

The imaging apparatus 100 includes an objective lens 1, a half mirror 2, an imaging device (first focus imaging device, formed-image-capturing device) 3, a first-focus-image-capturing controller (imaging unit) 4, an optical path length change filter 5, an imaging device (second focus imaging device, defocused-image-capturing device) 6, a second-focus-image-capturing controller (imaging unit) 7, and a transmission unit 8.

The objective lens 1 is an optical system for forming an image of a subject on the imaging device in order to capture the image of the subject, as in the case of a general digital camera.

The half mirror 2 splits light that has passed through the objective lens 1 in order that the imaging device 3 and the imaging device 6 receive the light.

The imaging device 3 captures an image formed on an imaging plane in the first focus of the objective lens 1.

The first-focus-image-capturing controller 4 acquires the image captured by the imaging device 3. It should be noted that the image acquired by the imaging device 3 and the first-focus-image-capturing controller 4 are hereinafter referred to as a first focus image. In the first focus image, a high-frequency component of the subject, which is not captured by one pixel of the imaging device 3, is rounded in one pixel.

The optical path length change filter 5 is a filter for precisely adjusting an optical path length from the objective lens 1 to the imaging device 6. It should be noted that in this embodiment, the optical path length change filter 5 is used to adjust the optical path length, but in place of this, for example, a configuration to adjust the optical path length by adjusting the position of the imaging device 6 may be provided.

The imaging device 6 captures an image defocused (blurred) by the optical path length change filter 5 in the second focus.

The second-focus-image-capturing controller 7 acquires the image captured by the imaging device 6. It should be noted that the image acquired by the imaging device 6 and the second-focus-image-capturing controller 7 is hereinafter referred to as a second focus image. In the second focus image, a high-frequency component of the subject, which is not captured by one pixel of the imaging device 6, is diffused over a plurality of pixels and comes out in a blurred form.

It should be noted that the first-focus-image-capturing controller 4 and the second-focus-image-capturing controller 7 may be integrated as one imaging controller.

The transmission unit 8 transmits the first focus image supplied from the first-focus-image-capturing controller 4 and the second focus image supplied from the second-focus-image-capturing controller 7 to the development apparatus 200.

In the above configuration, the half mirror 2 and the two imaging devices 3 and 6 are used to acquire the first focus image and the second focus image at the same time. In the case where the two images do not have to be acquired at the same time, however, a mechanism to add the optical path length change filter 5 to the optical path or remove the optical path length change filter 5 from the optical path may be provided, so that the half mirror 2 may be removed and the first focus image and the second focus image may be acquired by one imaging device.

Subsequently, the configuration of the development apparatus 200 will be described.

The development apparatus 200 includes a reception unit 9, an angle-of-view adjustment unit 10, a diffusion processing unit (diffusion unit) 11, an upsampling processing unit (upsampling unit) 12, a difference calculation unit 13, a de-blurring processing unit 14, and a component synthesis processing unit 15.

The reception unit 9 receives the first focus image and the second focus image, which are transmitted from the transmission unit 8 of the imaging apparatus 100. Both of the received images are supplied to the angle-of-view adjustment unit 10.

The angle-of-view adjustment unit 10 adjusts the angle of view of each of the first focus image and the second focus image that have slightly different angles of view because of the different focuses, to appropriately perform the following processing for each pixel. The adjustment of the angle of view may be performed on only one of the first focus image and the second focus image.

The diffusion processing unit 11 uses a point spread function to change the first focus image into an image in a defocused state by computing. This image is hereinafter referred to as a digital defocused image. Through this processing, the first focus image is changed into a digitally blurred image. In the case where the original first focus image is an image with an HD (High Definition) size and if an image to be developed is a 4K resolution image, for example, the digital defocused image is enlarged to be an image with a 4K size. In the case where the image to be developed is an image with an 8K size, the diffusion processing unit 11 performs defocusing to acquire an 8K size image.

The upsampling processing unit 12 performs upsampling on the second focus image. For example, in the case where the second focus image is an HD size image and an image to be developed is a 4K resolution image, the upsampling processing unit 12 doubles the number of pixels vertically and horizontally arranged to obtain a 4K size image. The image obtained by the upsampling is hereinafter referred to as an enlarged defocused image. In the case where the image to be developed is an 8K size image, the upsampling processing unit 12 performs upsampling to obtain an 8K size image.

The difference calculation unit 13 calculates a difference value for each pixel between the digital defocused image, which is generated by the diffusion processing unit 11, and the enlarged defocused image, which is generated by the upsampling processing unit 12. The calculation result is hereinafter referred to as an interference image.

The de-blurring processing unit 14 is constituted of a learning-type pattern conversion circuit and performs de-blurring processing on the interference image supplied from the difference calculation unit 13 to generate a high-frequency component. The de-blurring processing unit 14 regards this interference image as a defocused image and generates a high-frequency component of an image with a resolution higher than the resolution of the first focus image by an inverse operation method for the original image before the defocusing.

The component synthesis processing unit 15 synthesizes the high-frequency component, which is generated by the de-blurring processing unit 14, and a low-frequency component (first focus image), which is supplied from the reception unit 9, into one image by component synthesis processing. The synthesized image is hereinafter referred to as a developed image.

Hereinabove, the overall configuration has been described.

[Modified Example of Overall Configuration]

Figure 2:
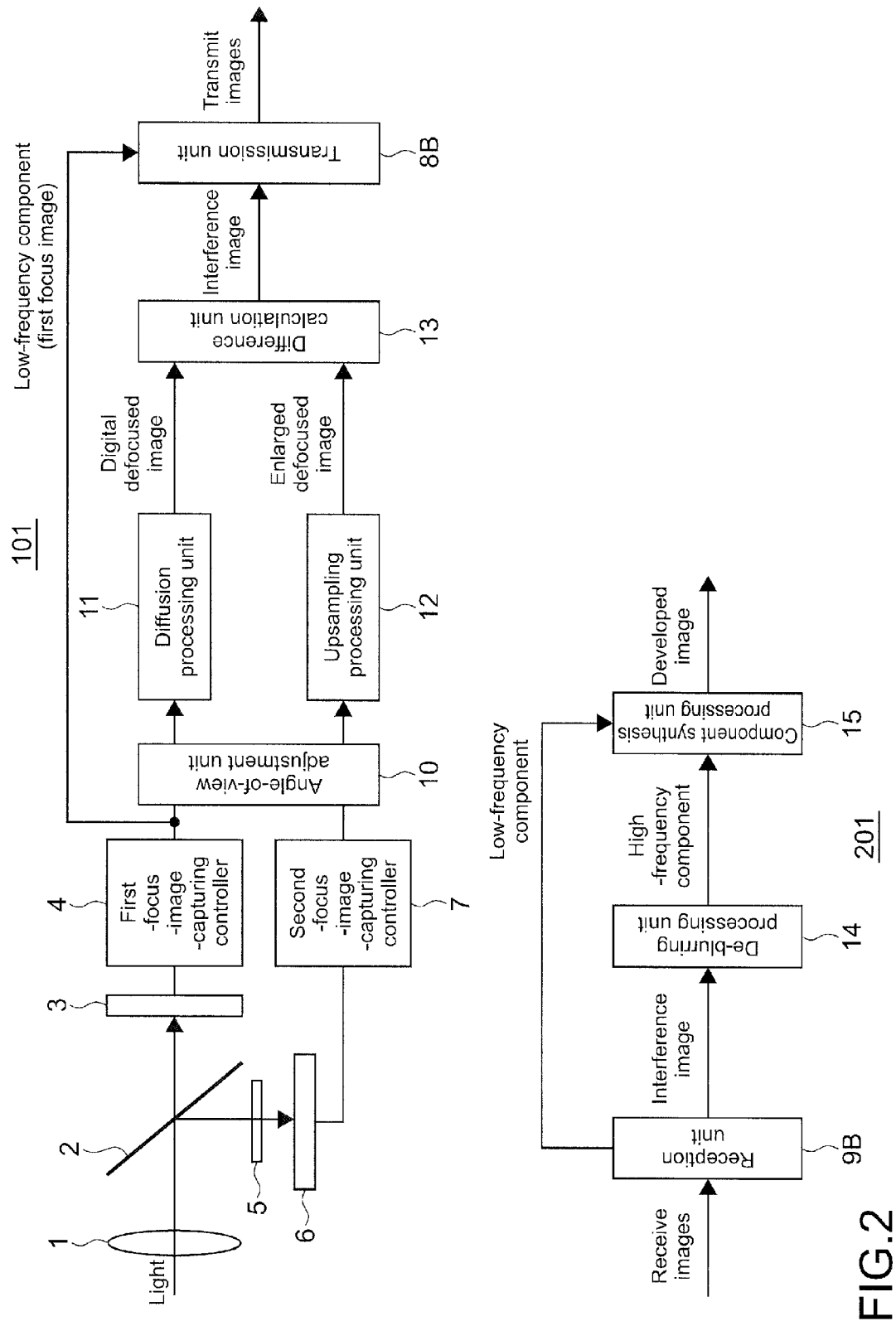
FIG. 2 is a configuration diagram showing an overall configuration of another imaging apparatus and another development apparatus according to the embodiment of the present disclosure.

Next, an imaging apparatus 101 and a development apparatus 201 that have configurations different from the above configurations will be described. FIG. 2 is a configuration diagram showing an overall configuration of the imaging apparatus 101 and the development apparatus 201 according to the embodiment of the present disclosure.

The main difference from the configurations described above is that the angle-of-view adjustment unit 10, the diffusion processing unit 11, the upsampling processing unit 12, and the difference calculation unit 13 of the development apparatus 200 are moved to the imaging apparatus 101 side. It should be noted that constituent elements having the same functions as those of the above constituent elements are denoted by the same reference symbols and description thereof will be omitted.

The imaging apparatus 101 includes an objective lens 1, a half mirror 2, an imaging device 3, a first-focus-image-capturing controller 4, an optical path length change filter 5, an imaging device 6, a second-focus-image-capturing controller 7, the angle-of-view adjustment unit 10, the diffusion processing unit 11, the upsampling processing unit 12, the difference calculation unit 13, and a transmission unit 8B.

The transmission unit 8B transmits an interference image, which is generated by the difference calculation unit 13, and a low-frequency component (first focus image) supplied from the first-focus-image-capturing controller 4, to the development apparatus 201.

The development apparatus 201 includes a reception unit 9B, a de-blurring processing unit 14, and a component synthesis processing unit 15.

The reception unit 9B receives the interference image and the low-frequency component transmitted from the transmission unit 8B of the imaging apparatus 101. The received interference image is supplied to the de-blurring processing unit 14, and the received low-frequency component is supplied to the component synthesis processing unit 15.

Hereinabove, the modified example of the overall configuration has been described.

[Concept of High Resolution Development]

Figure 3:
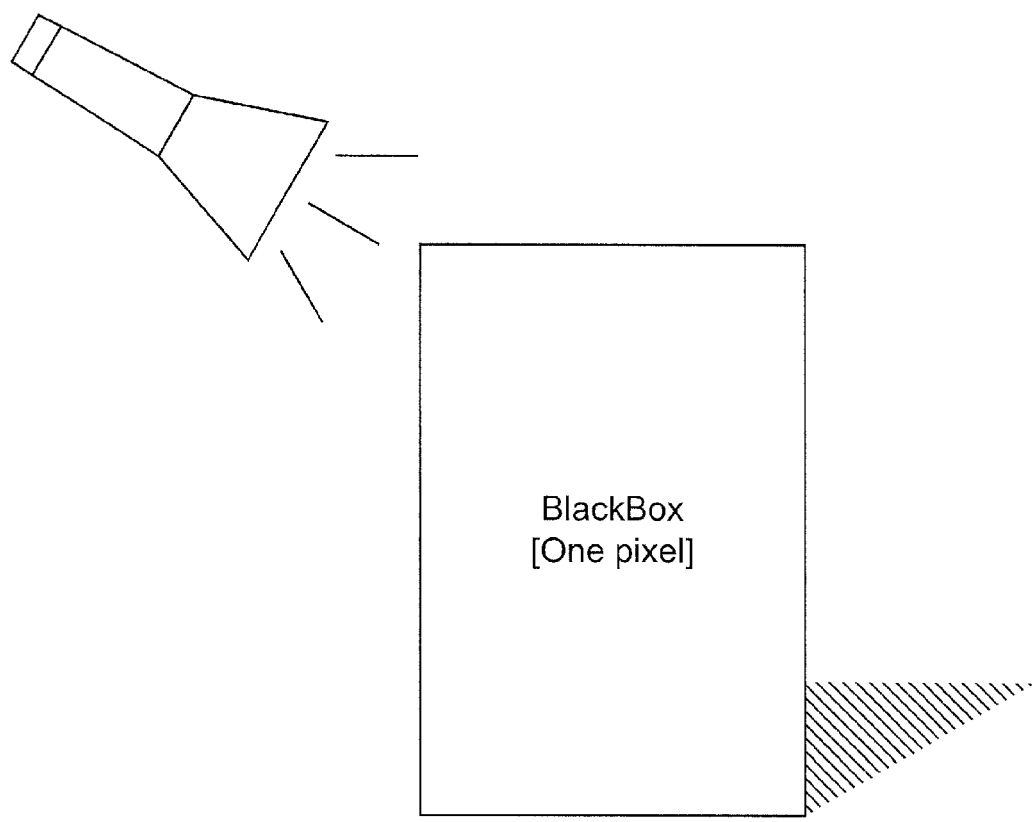
FIG. 3 is a diagram for describing a concept of a high resolution development.

Subsequently, a concept of the high resolution development will be described. FIG. 3 is a diagram for describing the concept of the high resolution development.

One pixel of the imaging device is regarded as a black box, and light is applied to the black box from the side with a flashlight to generate a shadow outside the one pixel. The shadow is to be a signal that is finer than the one pixel and leaks out to the next pixel.

The signal that is finer than the one pixel is not observed normally. When the light is applied from the side with the flashlight, however, the shadow of that finer signal appears on an adjacent pixel. The high resolution development according to the embodiment of the present disclosure uses the fact that, like this shadow, a trace of the signal finer than the one pixel leaks out to the adjacent pixel when the focus is shifted, to develop information finer than the one pixel based on the trace.

Figure 4:
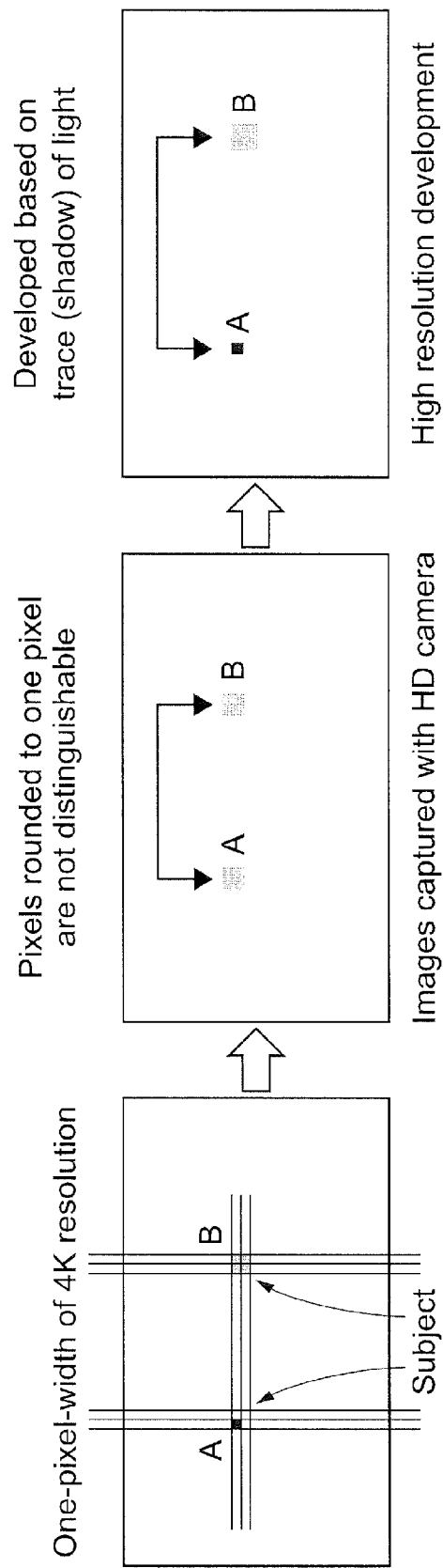
FIG. 4 is a diagram showing what effects are provided by the high resolution development according to the embodiment of the present disclosure.

Subsequently, the high resolution development according to the embodiment of the present disclosure will be described from a different perspective. FIG. 4 is a diagram showing what effects are provided by the high resolution development according to the embodiment of the present disclosure.

FIG. 4 shows, on its left part, the size of subjects, that is, a subject A corresponding to one pixel and a subject B corresponding to four pixels of the 4K resolution. FIG. 4 shows, on its center part, the size of the imaged subjects A and B. When those subjects A and B are imaged with an HD camera, both of an image A and an image B are expressed in the size corresponding to one pixel of the HD resolution. FIG. 4 shows, on its right part, that the development in the 4K size is performed by the high resolution development based on the trace (shadow) of the light and thus the image of the subject A is restored to be the image corresponding to one pixel of the 4K resolution.

Figure 5:
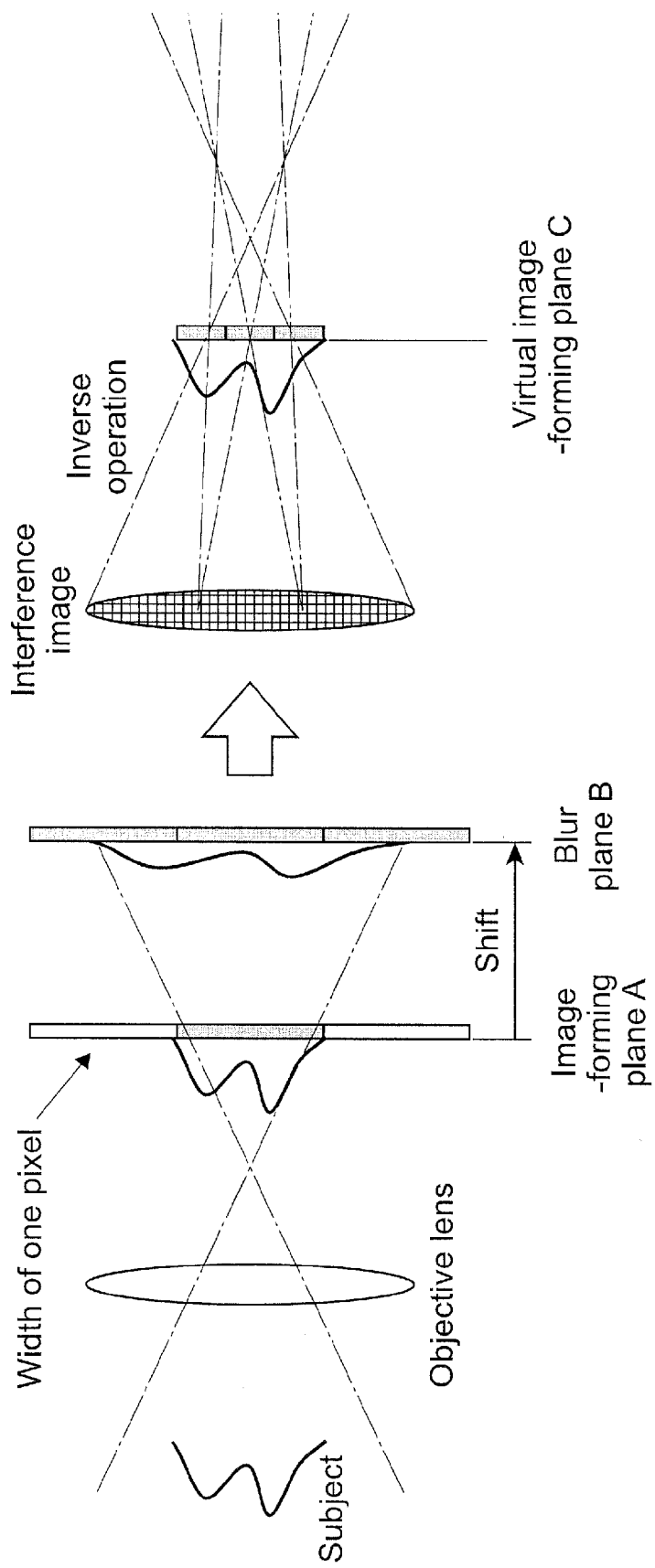
FIG. 5 is a diagram for describing a concept of generating a high resolution image by an inverse operation using a defocused image.

Subsequently, the concept of generating a high resolution image by an inverse operation using a defocused image will be described. FIG. 5 is a diagram for describing the concept of generating the high resolution image by the inverse operation using the defocused image.

With reference to the left part of FIG. 5, when an image of the subject is formed on an image-forming plane A, the image occupies an area corresponding to one pixel, but on a blur plane B that is defocused by shifting the image-forming plane A, a blurred image is formed over the next pixels and captured in the size corresponding to three pixels. This means that the high-frequency component, which is too finer than the one pixel of the imaging device to be observed in the one pixel, is observed as blurred information. FIG. 5 shows, on its right part, that an image with a resolution higher than the original resolution of the imaging device is developed on a virtual image-forming plane C by an inverse operation using the interference image.

Hereinabove, the concept of the high resolution development has been described.

[System of High Resolution Development]

In general, it is difficult for the imaging device to image information smaller than an imaging pixel, and if the subject has complex information, the information smaller than the imaging pixel is rounded as information on one pixel of the imaging device. Meanwhile, when the focal point is moved, the image of the subject is diffused to extend over adjacent imaging pixels, and thus the information that is not captured by the one pixel of the imaging pixel comes out also on the adjacent imaging pixels.

In the embodiment of the present disclosure, a difference between the digital defocused image and an actual defocused image is obtained. The digital defocused image is obtained by diffusing the formed image by the point spread function so as to obtain a predetermined blur amount. As a result, the information on the high-frequency component that is not captured by the one imaging pixel remains in the interference image, which is obtained from the difference, in the form where the image is diffused. This information is subjected to an inverse operation for the virtual image-forming plane, so that the finer high-frequency component that is not captured by the one imaging pixel is calculated and the image information finer than the resolution of the imaging device is developed.

[Inverse Operation Method for Virtual Image-Forming Plane]

The obtained interference image and the actual high-frequency component have a geometric correlativity, and an input signal and an instructional signal desired to be eventually acquired are given to the learning-type pattern conversion circuit to perform reinforcement learning, thus establishing an inverse operation module (de-blurring processing unit 14). With this inverse operation module, it has been found that an image with a resolution higher than that of the imaging device can be obtained.

[Defocus Amount]

Figure 6:
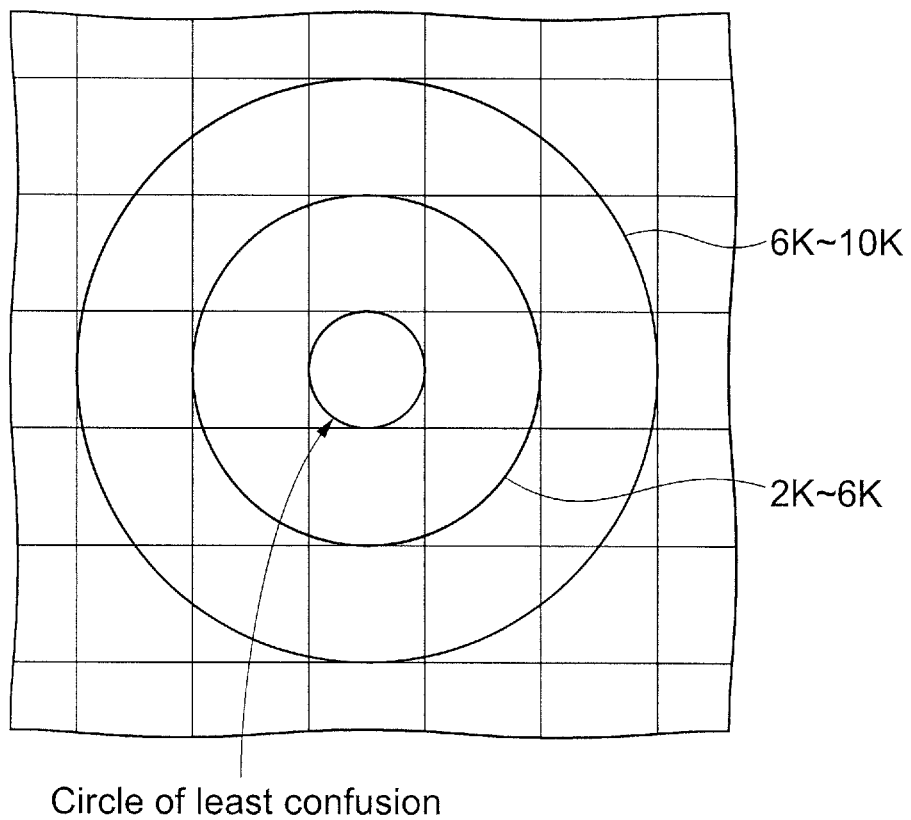
FIG. 6 is a diagram showing a defocus amount.

Subsequently, the defocus amount when the defocused image is captured will be described. FIG. 6 is a diagram showing the defocus amount.

Each of the rectangles shown in FIG. 6 expresses a pixel of the imaging device. The innermost circle is a circle of least confusion of the optical system in the imaging apparatus 100 or 101.

For example, in the case where the imaging device has the HD resolution and an image to be developed is a 4K resolution image, defocusing is performed until the size of the circle of confusion is changed into the size of a circle indicated by "2K-6K" in FIG. 6.

Further, for example, in the case where the imaging device has the HD resolution and an image to be developed is an 8K resolution image, defocusing is performed until the size of the circle of confusion is changed into the size of a circle indicated by "6K-10K" in FIG. 6.

In the above example, the resolutions of HD, 4K, and 8K are exemplified. In the case of other resolutions, defocusing may be performed at the same ratio as in the case of the resolutions of HD, 4K, and 8K.

Hereinabove, the defocus amount has been described.

[Defocus Method]

Figure 7:
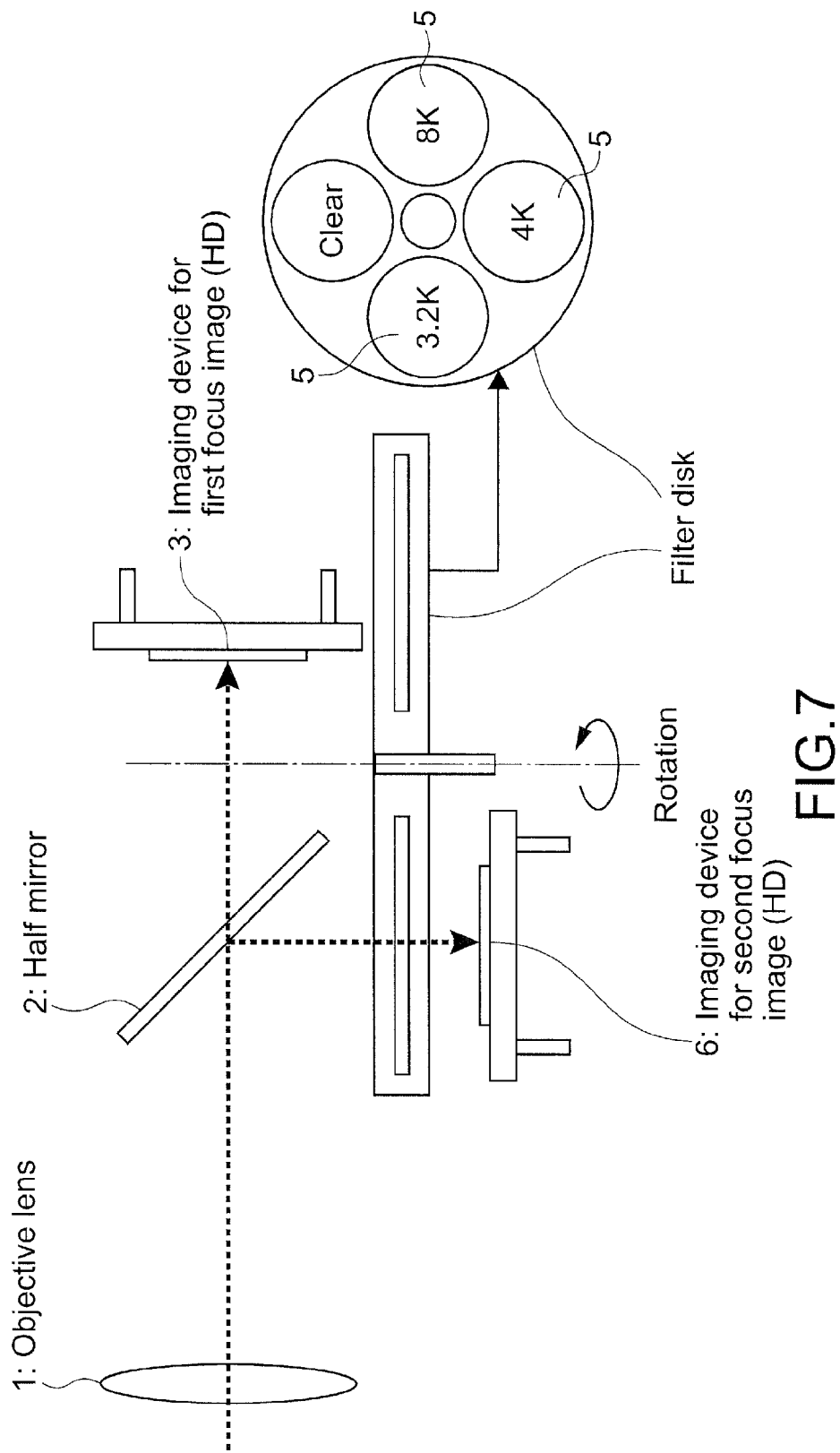
FIG. 7 is a diagram for describing a specific example of the defocus method.

Subsequently, a specific example of the defocus method will be described. FIG. 7 is a diagram for describing a specific example of the defocus method.

Although the optical path length change filter 5 is already described in the section of the overall configuration, as described regarding the defocus amount, the defocus amount has to be adjusted depending on the resolution of an image to be developed. A filter disk is exemplified as a specific example of an adjustment of the defocus amount.

As shown in FIG. 7, for example, optical path length change filters 5 for developing images with resolutions of 3.2K, 4K, and 8K are fitted into a filter disk. The imaging apparatus 100 or 101 rotates the filter disk in accordance with the resolution of an image to be developed, and uses an appropriate optical path length change filter 5 to perform a high resolution development corresponding to a target resolution.

Hereinabove, the specific example of the defocus method has been described.

[Component Synthesis Processing]

Figure 8:
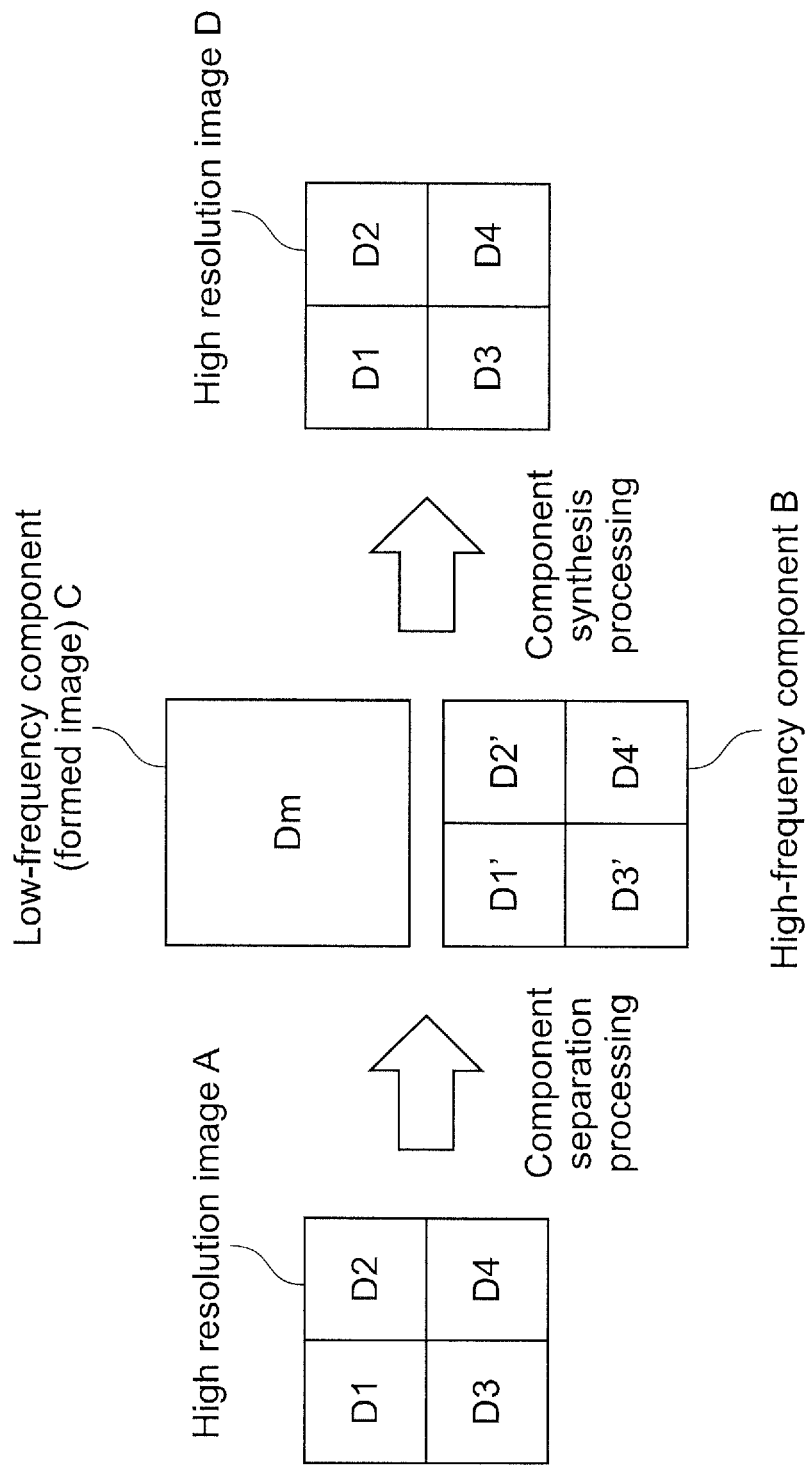
FIG. 8 is a diagram showing component separation processing and component synthesis processing.

Subsequently, the component synthesis processing will be described together with component separation processing. FIG. 8 is a diagram showing the component separation processing and the component synthesis processing.

First, the component separation processing will be described. It is assumed that a high resolution image A includes four pixels D1, D2, D3, and D4. In the component separation processing, a low-frequency component C and a high-frequency component B are generated by the following expressions, where the high-frequency component B is constituted of pixel values D1', D2', D3', and D4':

Low-frequency component $C$=Pixel mean value $Dm$= $(D1+D2+D3+D4)/4$;

$D1'=D1-Dm$;

$D2'=D2-Dm$;

$D3'=D3-Dm$; and $D4'=D4-Dm$.

The component synthesis processing is an inverse operation of the component separation processing. Pixel values D1 to D4 of a high resolution image D to be obtained can be obtained by the following expressions:

$D1=D1'+Dm$;

$D2=D2'+Dm$;

$D3=D3'+Dm$; and $D4=D4'+Dm$.

Here, the component synthesis processing is performed assuming the first focus image (of HD size) to be a low-frequency component and a processing result of the de-blurring processing unit 14 to be a high-frequency component, and thus a high resolution image (of 4K size) can be obtained as a developed image.

Hereinabove, the component synthesis processing has been described.

[Implementation Examples of Imaging Apparatus]

Figure 9:
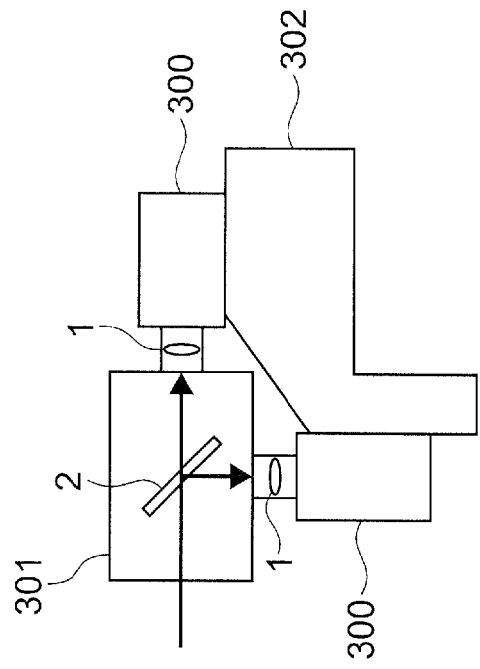
FIG. 9 is a diagram showing implementation examples of the imaging apparatus.
Figure 9:
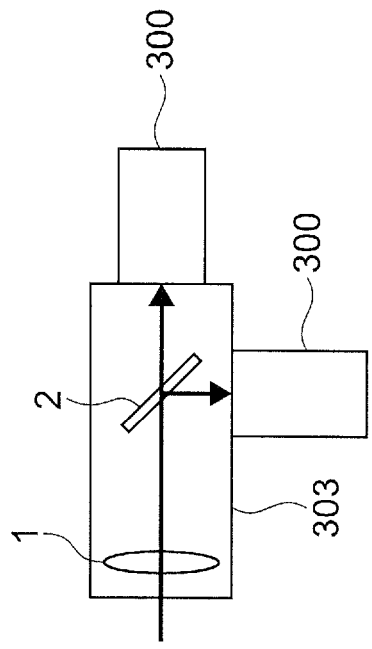
Figure 9:
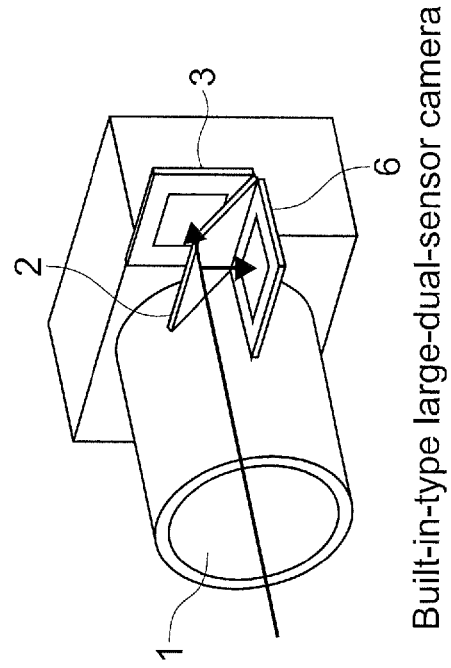
Figure 9:
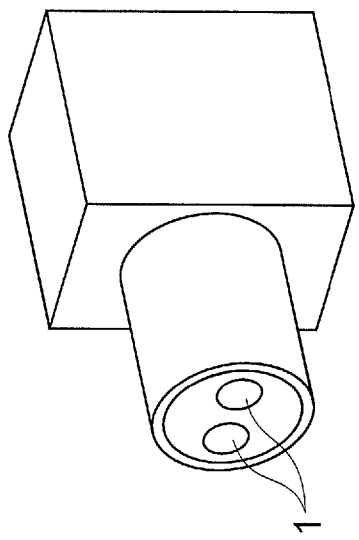

Next, implementation examples of the imaging apparatus will be described. FIG. 9 is a diagram showing the implementation examples of the imaging apparatus.

A "built-in-type large-dual-sensor camera" on the upper left part of FIG. 9 has a configuration that is the most similar to the overall configuration shown in FIG. 1 and FIG. 2.

A "half-mirror-rig-system stereo camera" on the upper right part of FIG. 9 has a configuration in which objective lenses 1 and cameras 300 are arranged on the rear side of a half mirror 2 within a beam splitter 301 and are fixed by a rig 302.

A "large-lens-spectral-type stereo camera" on the lower right part of FIG. 9 has a configuration in which a half mirror 2 is arranged inside a large lens 303.

A "parallel-system stereo camera" on the lower left part of FIG. 9 is for defocusing one of images captured with left and right objective lenses 1. The point of sight shifts between the left and right images and this limits the enhancement of resolution, but this camera produces certain effects.

It should be noted that those implementation examples are also applied to the embodiments described below, in addition to the first embodiment.

Hereinabove, the implementation examples of the imaging apparatus have been described.

[Specific Examples]

Next, an example in which the high resolution development is performed using the high resolution development technique according to the embodiment of the present disclosure will be described.

Figure 10:
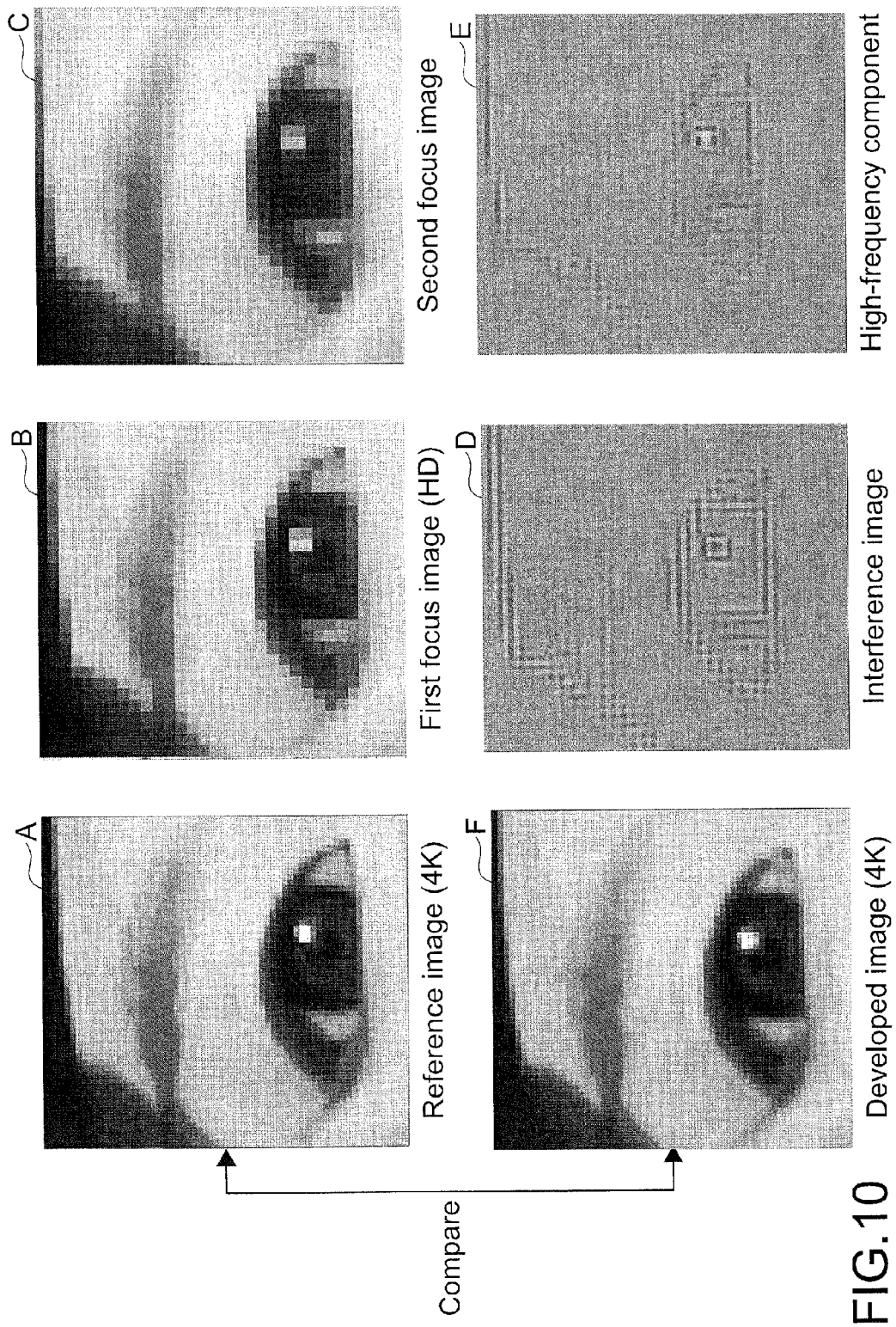
FIG. 10 is a diagram showing that a 4K image as a reference is used to generate a first focus image and a second focus image, and the high resolution development is performed on the first focus image and the second focus image to generate a developed image through an interference image and a high-frequency component.

FIG. 10 is a diagram showing that a 4K image A as a reference is used to generate a first focus image B and a second focus image C, and the high resolution development is performed on the first focus image B and the second focus image C to generate a developed image F through an interference image D and a high-frequency component E. Comparing the reference 4K image A with the developed image F, it is found that there is not a large difference therebetween. However, in the high resolution development performed herein, a specific pattern is intensively learned in the learning-type pattern conversion circuit.

Figure 11:
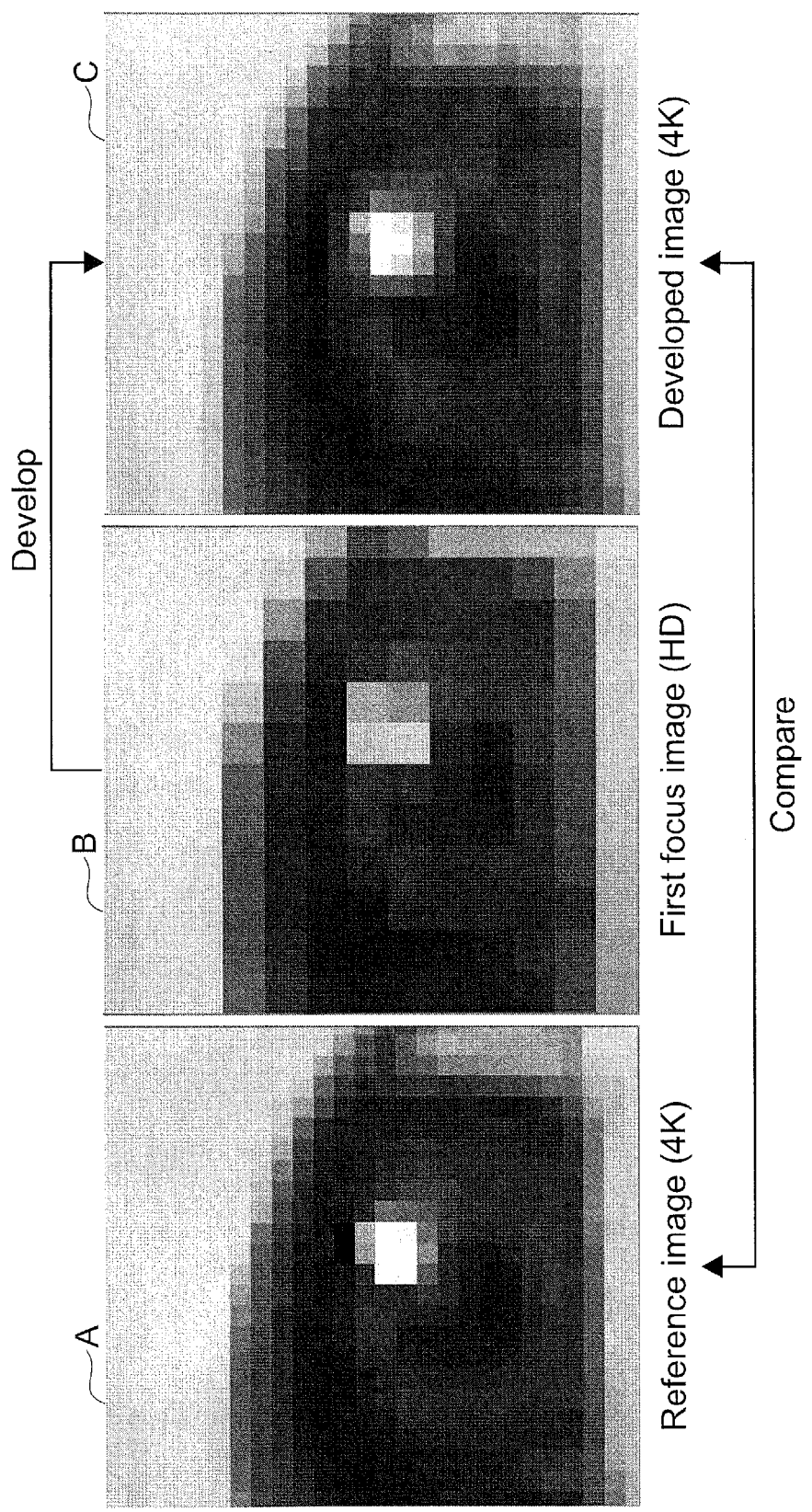
FIG. 11 is a diagram showing images obtained by enlarging black-eye parts of the images shown in FIG. 10.

FIG. 11 is a diagram showing images obtained by enlarging black-eye parts of the images shown in FIG. 10. Comparing a reference image A with a developed image C, it is found that the development accuracy of the developed image C is about nine-tenths of the development accuracy of the reference image A.

Figure 12:
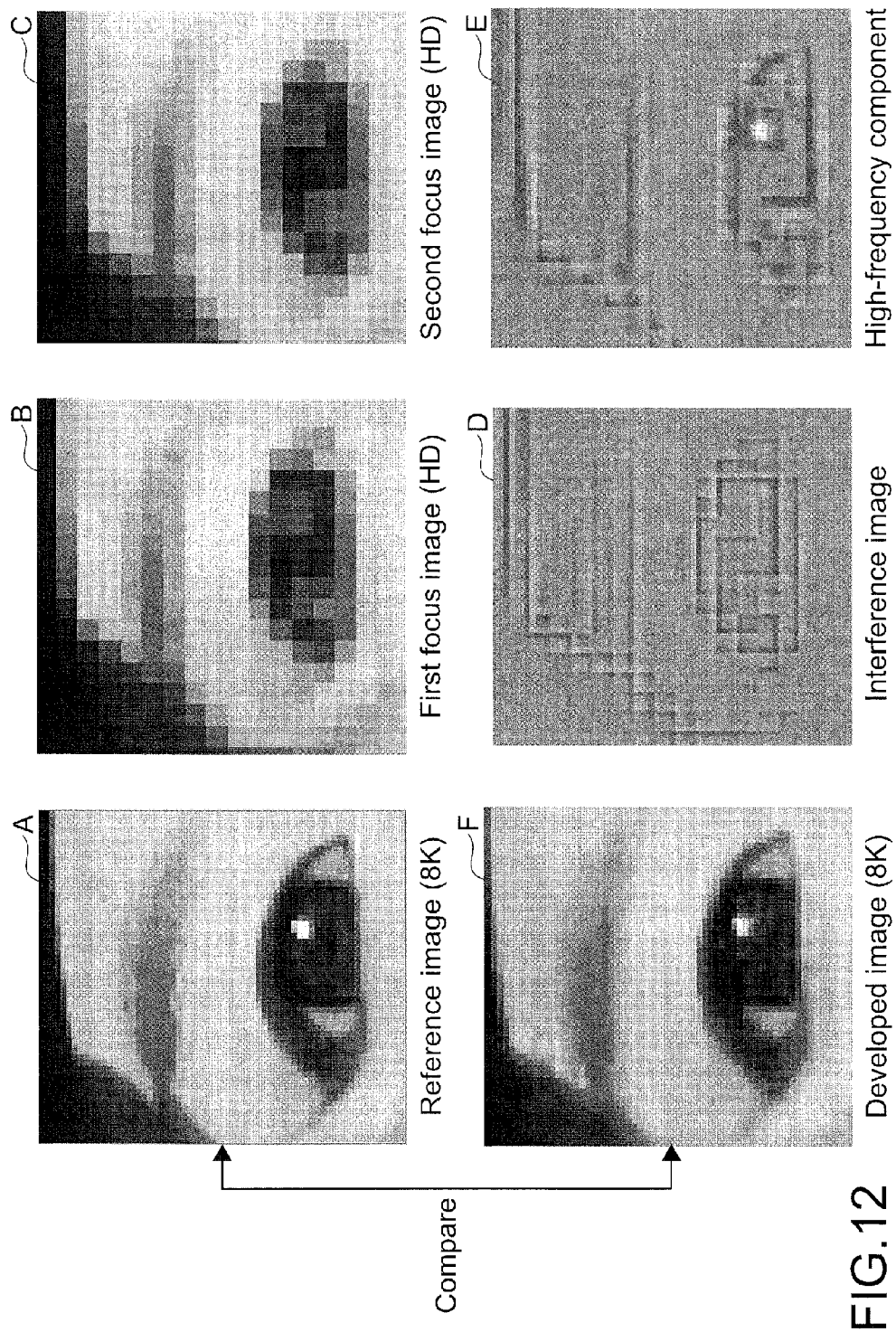
FIG. 12 is a diagram showing that an 8K image as a reference is used to generate a first focus image and a second focus image, and the high resolution development is performed on the first focus image and the second focus image to generate a developed image through an interference image and a high-frequency component.

FIG. 12 is a diagram showing that an 8K image A as a reference is used to generate a first focus image B and a second focus image C, and the high resolution development is performed on the first focus image B and the second focus image C to generate a developed image F through an interference image D and a high-frequency component E. Comparing the reference 8K image A with the developed image F, it is found that there is not a large difference therebetween. However, in the high resolution development performed herein, a specific pattern is intensively learned in the learning-type pattern conversion circuit.

Hereinabove, the first embodiment has been described.

Second Embodiment

The first embodiment achieves the high resolution of an image by acquiring the high-frequency component from the interference image. Now, the information acquired from the interference image is summed up.

In general, undulation is expressed by a mathematical expression of $Y*\sin(\omega t+\phi)$, and when the undulation is regarded as image information, Y is interpreted as luminance, $\omega$ is interpreted as spectral information of RGB, and $\phi$ is interpreted as stereoscopic information.

With a general camera in related art, only luminance information resolved into information on ergonomic three primary colors of RGB of light is developed.

Figure 13:
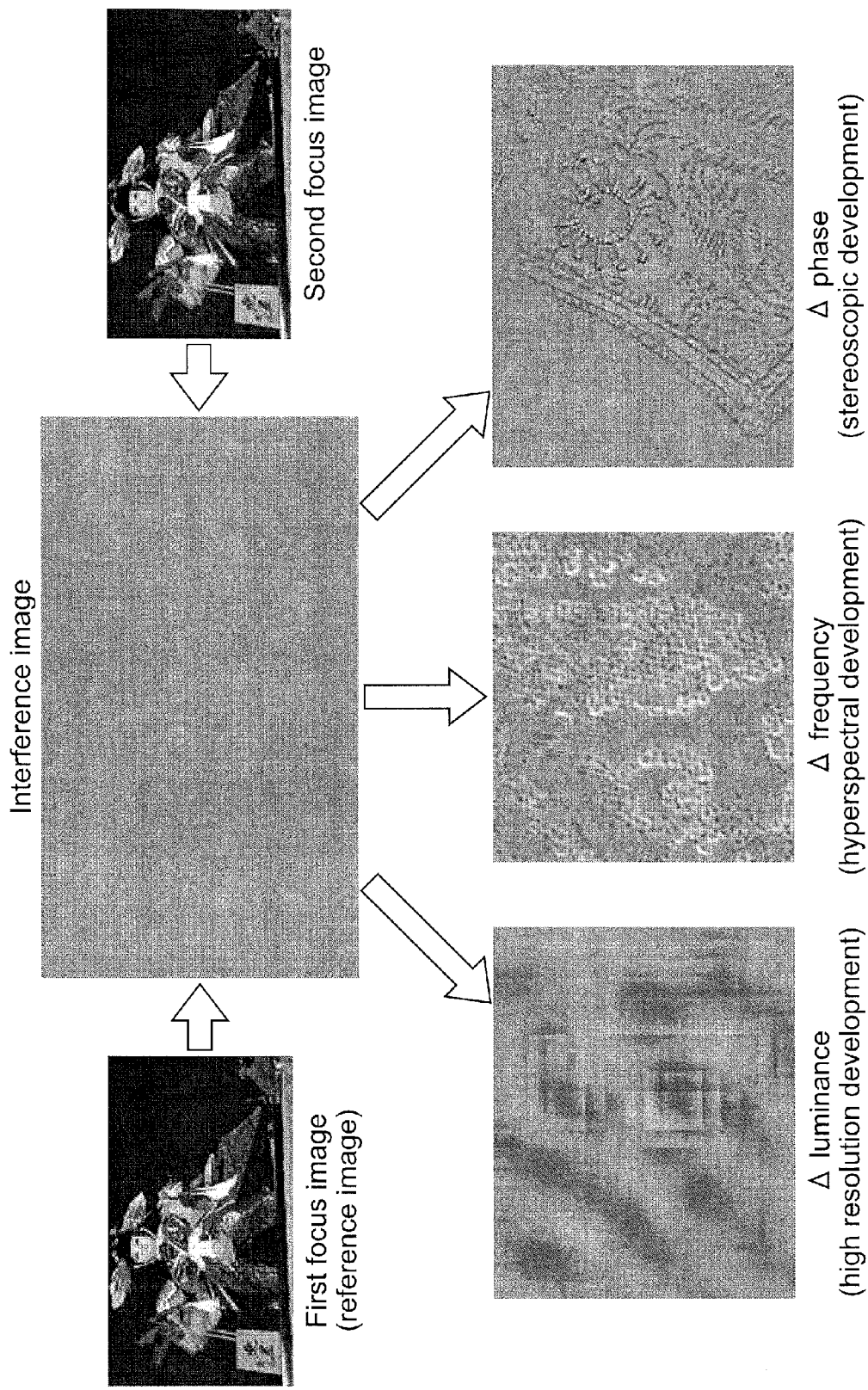
FIG. 13 is a diagram showing a state where information on Δ amount is separated from the interference image by an algorithm to develop a high resolution image by ΔY, a hyperspectral image by Δω, and a stereoscopic image by Δϕ.

The interference image obtained from the two images, i.e., the first focus image (formed image) and the second focus image (defocused image), contains information on change amounts of Y, $\omega$, and $\phi$ of the first focus image serving as a reference image. The inventor of the present disclosure found that the information on those change amounts can be separated from the interference image by an algorithm to develop a high resolution image by $\Delta Y$, a hyperspectral image by $\Delta\omega$, and a stereoscopic image or a refocused image by $\Delta\phi$ (see FIG. 13).

The high resolution development technique described in the first embodiment achieves a resolution exceeding the resolution of the imaging device by adding the information of $\Delta Y$ to the reference image.

Description will be given on a hyperspectral development using $\Delta\omega$ in the second embodiment, on a stereoscopic development using $\Delta\omega$ in a third embodiment, and on a refocusing development using $\Delta\phi$ in a fourth embodiment. Here, those development techniques are collectively referred to as a holographic development.

[Overall Configuration]

Figure 14:
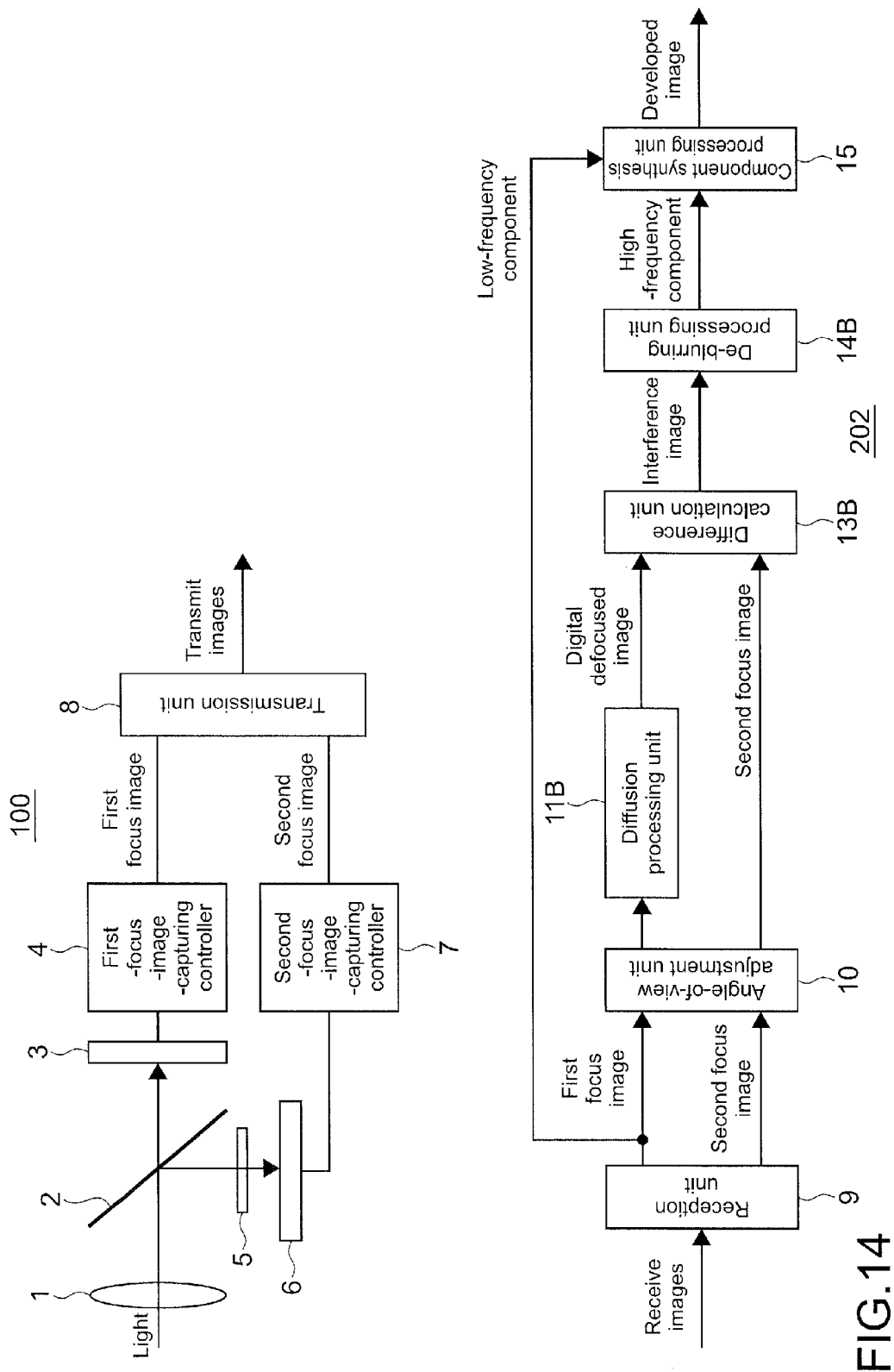
FIG. 14 is a configuration diagram showing an overall configuration of the imaging apparatus and another development apparatus according to another embodiment of the present disclosure.

First, the overall configuration of an imaging apparatus and a development apparatus according to an embodiment of the present disclosure will be described. FIG. 14 is a configuration diagram showing the overall configuration of an imaging apparatus 100 and a development apparatus 202 according to the embodiment of the present disclosure.

The configuration of the imaging apparatus 100 to be used in the second embodiment is the same as that of the first embodiment, and thus description thereof will be omitted.

The main difference on the development apparatus from the first embodiment is that the development apparatus 200 is replaced with the development apparatus 202, in which the upsampling processing unit 12 is removed and the diffusion processing unit 11, the difference calculation unit 13, and the de-blurring processing unit 14 are provided with different functions to be changed into a diffusion processing unit 11B, a difference calculation unit 13B, and a de-blurring processing unit 14B, respectively. In the following description, constituent elements having the same functions as those of the first embodiment are denoted by the same reference symbols and description thereof will be omitted.

The development apparatus 202 includes a reception unit 9, an angle-of-view adjustment unit 10, the diffusion processing unit 11B, the difference calculation unit 13B, the de-blurring processing unit 14B, and a component synthesis processing unit 15.

The diffusion processing unit 11B uses a point spread function to change the first focus image into a digital defocused image in a state defocused by computing. Through this processing, the first focus image is changed into a digitally blurred image. However, unlike the diffusion processing unit 11 of the first embodiment, the diffusion processing unit 11B does not enlarge the original first focus image, e.g., change the HD resolution to the 4K or 8K resolution.

The difference calculation unit 13B calculates a difference value for each pixel between the digital defocused image, which is generated by the diffusion processing unit 11B, and the second focus image, which is supplied from the angle-of-view adjustment unit 10, to generate an interference image.

The de-blurring processing unit 14B is constituted of a learning-type pattern conversion circuit and performs de-blurring processing on an interference image supplied from the difference calculation unit 13B to generate a high-frequency component. The de-blurring processing unit 14 regards this interference image as a defocused image and generates a high-frequency component of an image with a resolution higher than the resolution of the formed image by an inverse operation method for the original image before the defocusing. In the de-blurring processing unit 14B, however, learning by the learning-type pattern conversion circuit is performed so as to further emphasize contrast, compared with the de-blurring processing performed by the de-blurring processing unit 14 of the first embodiment.

Hereinabove, the overall configuration has been described.

[Modified Example of Overall Configuration]

Figure 15:
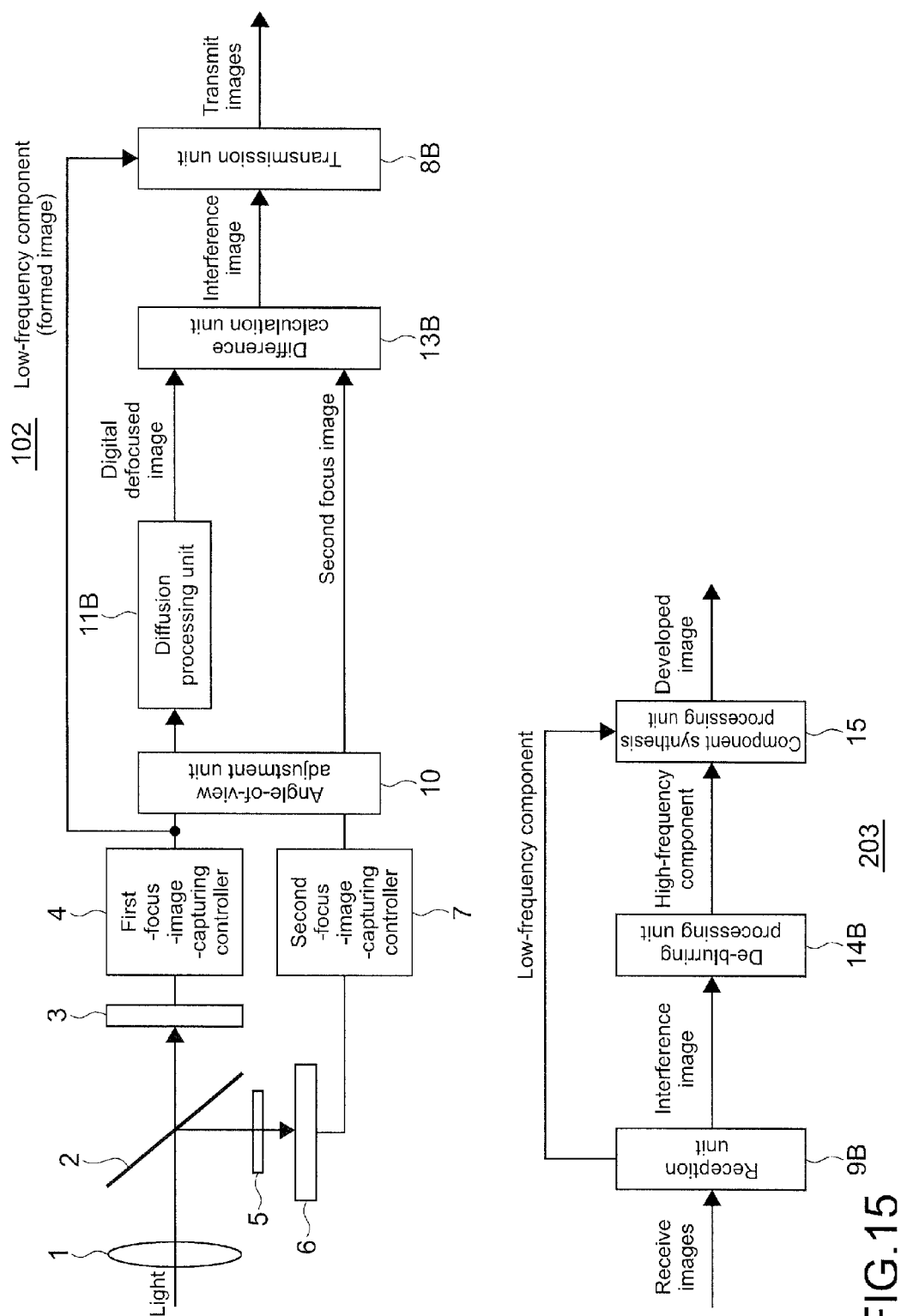
FIG. 15 is a configuration diagram showing an overall configuration of another imaging apparatus and another development apparatus according to the embodiment of the present disclosure.

Next, an imaging apparatus 102 and a development apparatus 203 that have configurations different from the above configurations will be described. FIG. 15 is a configuration diagram showing the overall configuration of the imaging apparatus 102 and the development apparatus 203 according to the embodiment of the present disclosure.

The main difference from the configurations described above is that the angle-of-view adjustment unit 10, the diffusion processing unit 11B, and the difference calculation unit 13B of the development apparatus 202 are moved to the imaging apparatus 102 side. It should be noted that constituent elements having the same functions as those of the above constituent elements are denoted by the same reference symbols and description thereof will be omitted.

The imaging apparatus 102 includes an objective lens 1, a half mirror 2, an imaging device 3, a first-focus-image-capturing controller 4, an optical path length change filter 5, an imaging device 6, a second-focus-image-capturing controller 7, the angle-of-view adjustment unit 10, the diffusion processing unit 11B, the difference calculation unit 13B, and a transmission unit 8B.

The development apparatus 203 includes a reception unit 9B, a de-blurring processing unit 14B, and a component synthesis processing unit 15.

Hereinabove, the modified example of the overall configuration has been described.

[Hyperspectral Development]

A color camera in related art resolves incident light into channels of the three primary colors of RGB of light and captures a full-color image by performing a monochrome photography on the respective colors. In this method, different colors of the same channel are not analyzed. Meanwhile, in the hyperspectral development, the focus is shifted to generate a prism spectrum derived from a magnification chromatic aberration and place spectral information in a moire pattern.

When an image of a white monotone subject is captured with a normal camera, the captured image is white. If the magnification chromatic aberration occurs, the white color is mixed with a magnification chromatic aberration of an adjacent pixel, and the color of the image still remains white. For that reason, nothing is observed from the white image.

Figure 16:
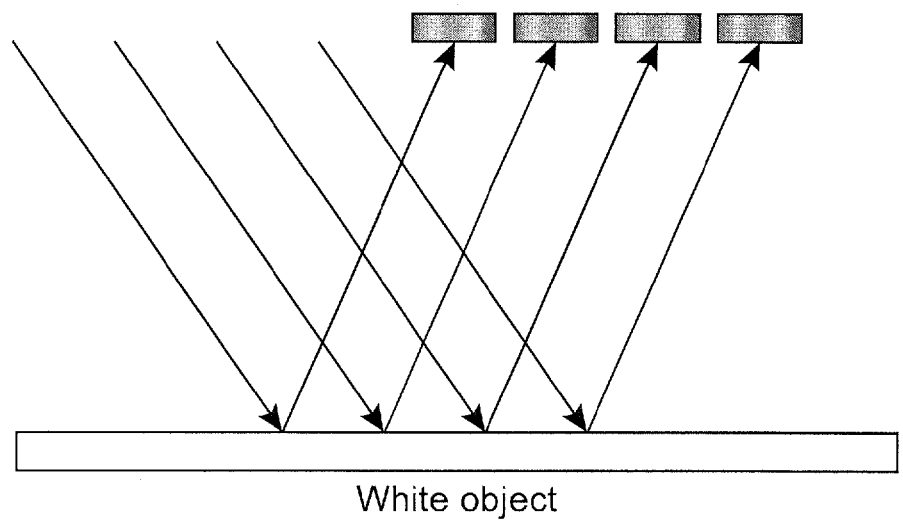
FIG. 16 is a diagram for describing a hyperspectral development.
Figure 16:
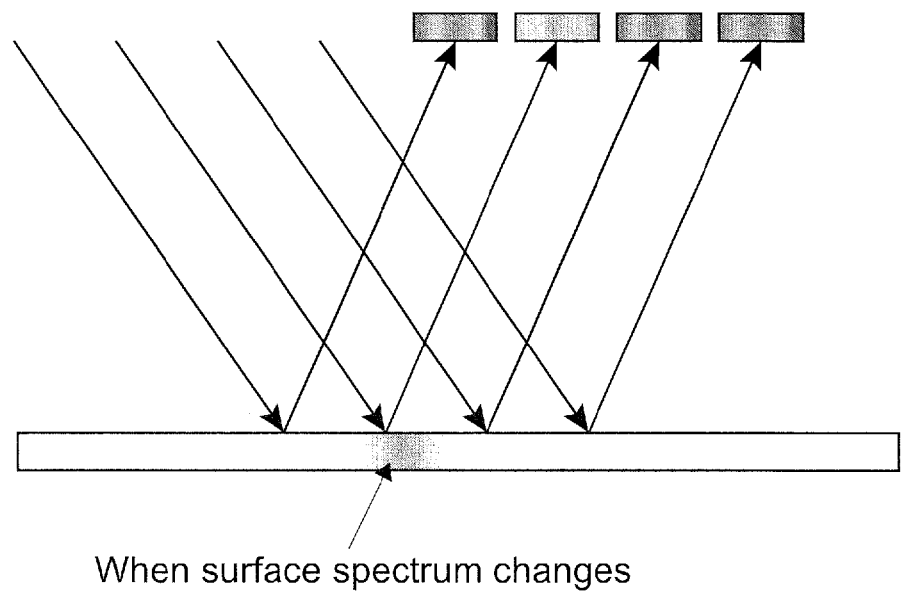

Meanwhile, in the case where a difference between two images, that is, between the first focus image and the second focus image or between the formed image and the defocused image, is observed, a trace of a magnification chromatic aberration can be slightly observed as aberration information in the moire pattern of the interference image due to a subtle change in spectral characteristics on a light-reflecting surface of the subject. This is because when the focus moves, the degree of the magnification chromatic aberration changes. This aberration information is emphasized by the learning-type pattern conversion circuit that performs learning so as to emphasize contrast, so that the subtle change on the surface of the subject, which has been difficult to capture with the camera in related art, can be captured (see FIG. 16).

[Specific Example of Hyperspectral Development]

Figure 17:
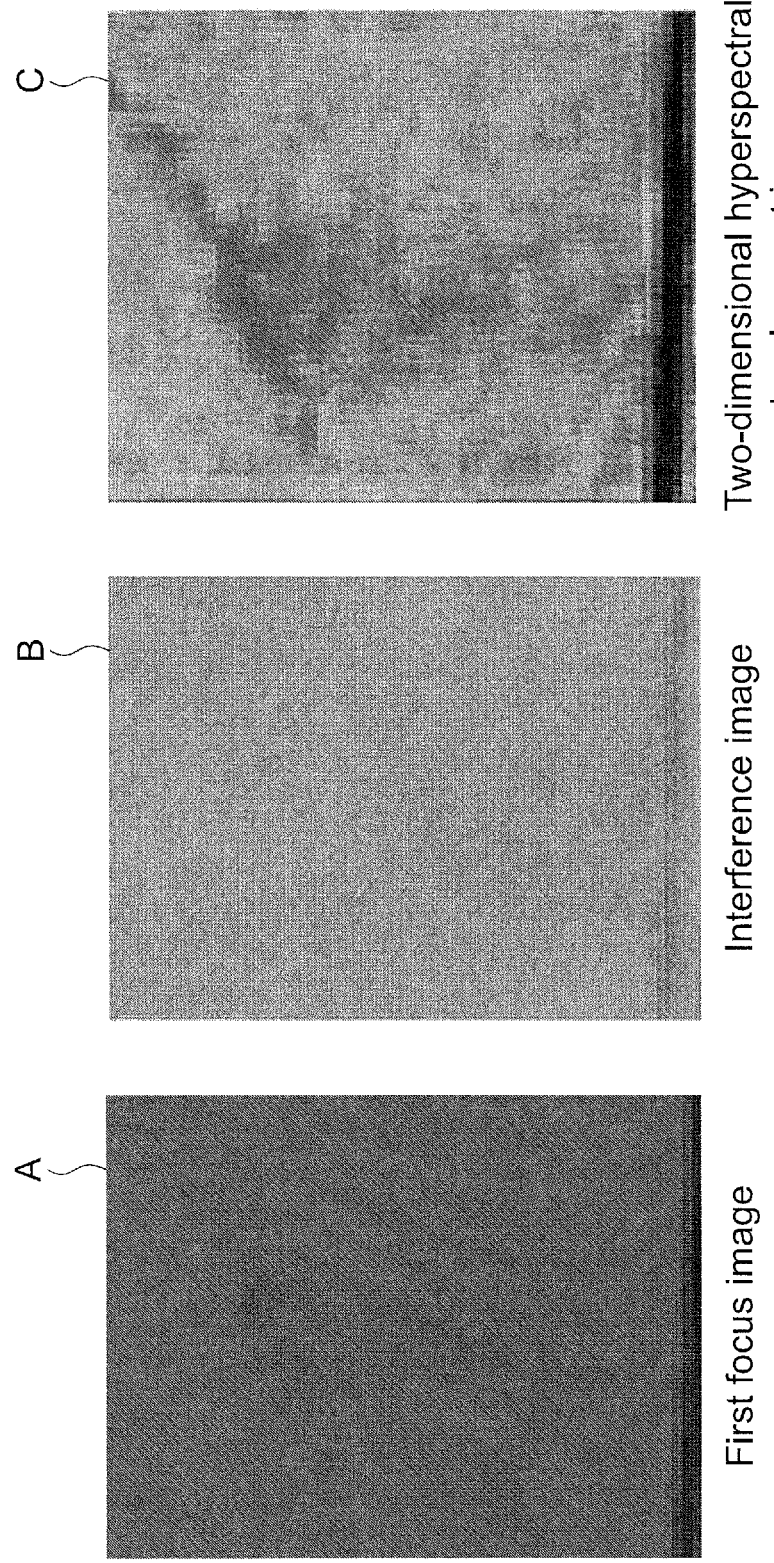
FIG. 17 is a diagram showing a specific example of the hyperspectral development.

Next, a specific example of the hyperspectral development will be described. FIG. 17 is a diagram showing a specific example of the hyperspectral development.

An image A is the first focus image before the hyperspectral development. An image B is the interference image. In this interference image, a moire pattern can be observed due to a slight difference in spectral characteristics when the focus is shifted. An image C is a developed image that has been subjected to a two-dimensional hyperspectral development. In the developed image, a slight contrast of the moire pattern is emphasized, and a state of a change with time that occurs around a crack appearing in the image can be observed in detail. This state of the change is difficult to observe in an image captured with a normal camera.

Hereinabove, the second embodiment has been described.

Third Embodiment

In the third embodiment, as mentioned above, a stereoscopic development technique using $\Delta\phi$ will be described.

[Overall Configuration]

Figure 18:
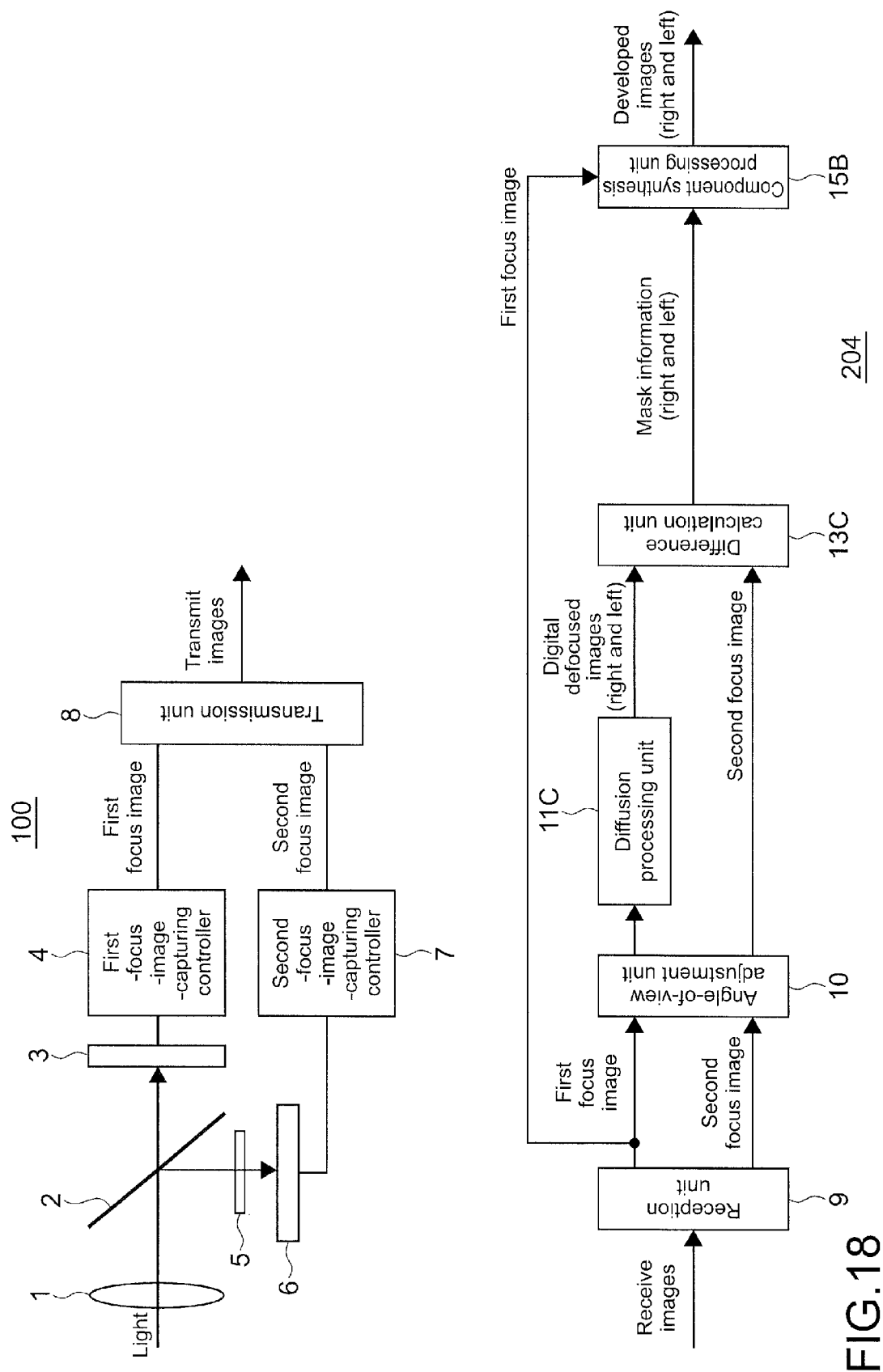
FIG. 18 is a configuration diagram showing an overall configuration of the imaging apparatus and another development apparatus according to another embodiment of the present disclosure.

First, the overall configuration of an imaging apparatus and a development apparatus according to an embodiment of the present disclosure will be described. FIG. 18 is a configuration diagram showing the overall configuration of an imaging apparatus 100 and a development apparatus 204 according to the embodiment of the present disclosure.

The configuration of the imaging apparatus 100 to be used in the third embodiment is the same as that of the first or second embodiment, and thus description thereof will be omitted.

The main difference on the development apparatus from the second embodiment is that the development apparatus 202 is replaced with the development apparatus 204, in which the de-blurring processing unit 14B is removed and the diffusion processing unit 11B, the difference calculation unit 13B, and the component synthesis processing unit 15 are provided with different functions to be changed into a diffusion processing unit 11C, a difference calculation unit 13C, and a component synthesis processing unit 15B, respectively. In the following description, constituent elements having the same functions as those of the embodiments described above are denoted by the same reference symbols and description thereof will be omitted.

The development apparatus 204 includes a reception unit 9, an angle-of-view adjustment unit 10, the diffusion processing unit 11C, the difference calculation unit 13C, and the component synthesis processing unit 15B.

The diffusion processing unit 11C uses a point spread function to change the first focus image into a digital defocused image in a state defocused by computing. However, unlike the embodiments described above, the diffusion processing unit 11C uses two point spread functions that are biased in a right direction and a left direction to be linearly symmetrical with each other to perform diffusion on the first focus image. Thus, two digital defocused images for a right image and a left image are generated.

In the above description, the diffusion processing unit 11C generates the two digital defocused images for the right image and the left image, but the images to be generated are not limited to the right image and the left image and may be an upper image and a lower image. When the digital defocused images for the upper image and the lower image are generated, a stereoscopic image eventually developed can be viewed stereoscopically in the state of being rotated by 90 degrees.

The difference calculation unit 13C calculates a difference value for each pixel between each of the two digital defocused images for the right image and the left image, which are generated by the diffusion processing unit 11C, and the second focus image, which is supplied from the angle-of-view adjustment unit 10, to generate two pieces of mask information for the right image and the left image.

Based on the two pieces of mask information for the right image and the left image, which are generated by the difference calculation unit 13C, and the formed image supplied from the reception unit 9, the component synthesis processing unit 15B synthesizes the two developed images of the right and left images for stereoscopic viewing.

Hereinabove, the overall configuration has been described.

[Modified Example of Overall Configuration]

Figure 19:
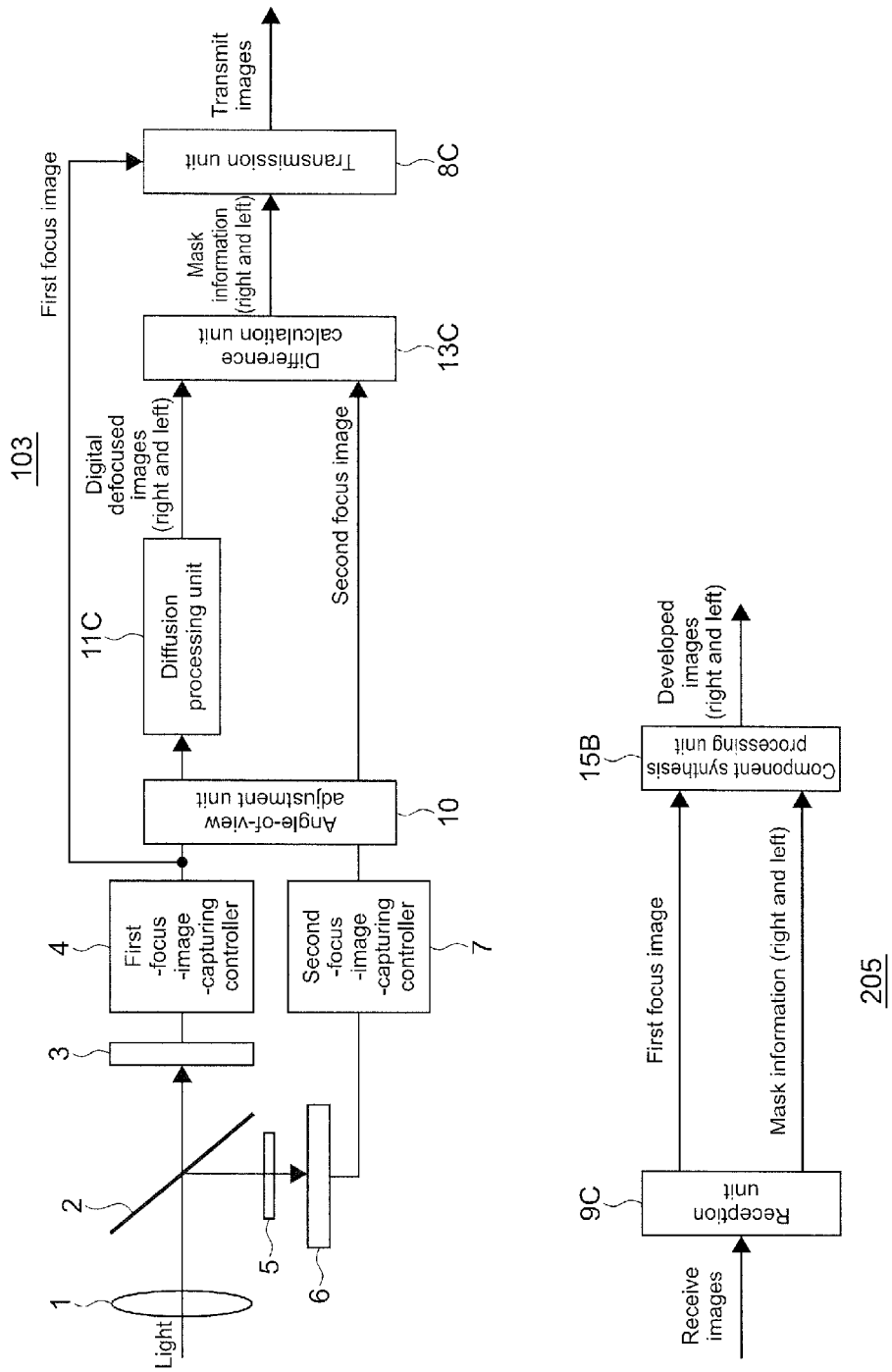
FIG. 19 is a configuration diagram showing an overall configuration of another imaging apparatus and another development apparatus according to the embodiment of the present disclosure.

Next, an imaging apparatus 103 and a development apparatus 205 that have configurations different from the above configurations will be described. FIG. 19 is a configuration diagram showing the overall configuration of the imaging apparatus 103 and the development apparatus 205 according to the embodiment of the present disclosure.

The main difference from the configurations described above is that the angle-of-view adjustment unit 10, the diffusion processing unit 11C, and the difference calculation unit 13C of the development apparatus 204 are moved to the imaging apparatus 103 side. It should be noted that description on constituent elements having the same functions as those of the above constituent elements will be omitted.

The imaging apparatus 103 includes an objective lens 1, a half mirror 2, an imaging device 3, a first-focus-image-capturing controller 4, an optical path length change filter 5, an imaging device 6, a second-focus-image-capturing controller 7, the angle-of-view adjustment unit 10, the diffusion processing unit 11C, the difference calculation unit 13C, and a transmission unit 8C.

The transmission unit 8C transmits the two pieces of mask information for the right image and the left image, which are generated by the difference calculation unit 13C, and the first focus image supplied from the first-focus-image-capturing controller 4, to the development apparatus 205.

The development apparatus 205 includes a reception unit 9C and a component synthesis processing unit 15B.

The reception unit 9C receives the two pieces of mask information for the right image and the left image and the first focus image, which are transmitted from the transmission unit 8C of the imaging apparatus 103. The received mask information and first focus image are supplied to the component synthesis processing unit 15B.

Hereinabove, the modified example of the overall configuration has been described.

[Processing Flow]

Figure 20:
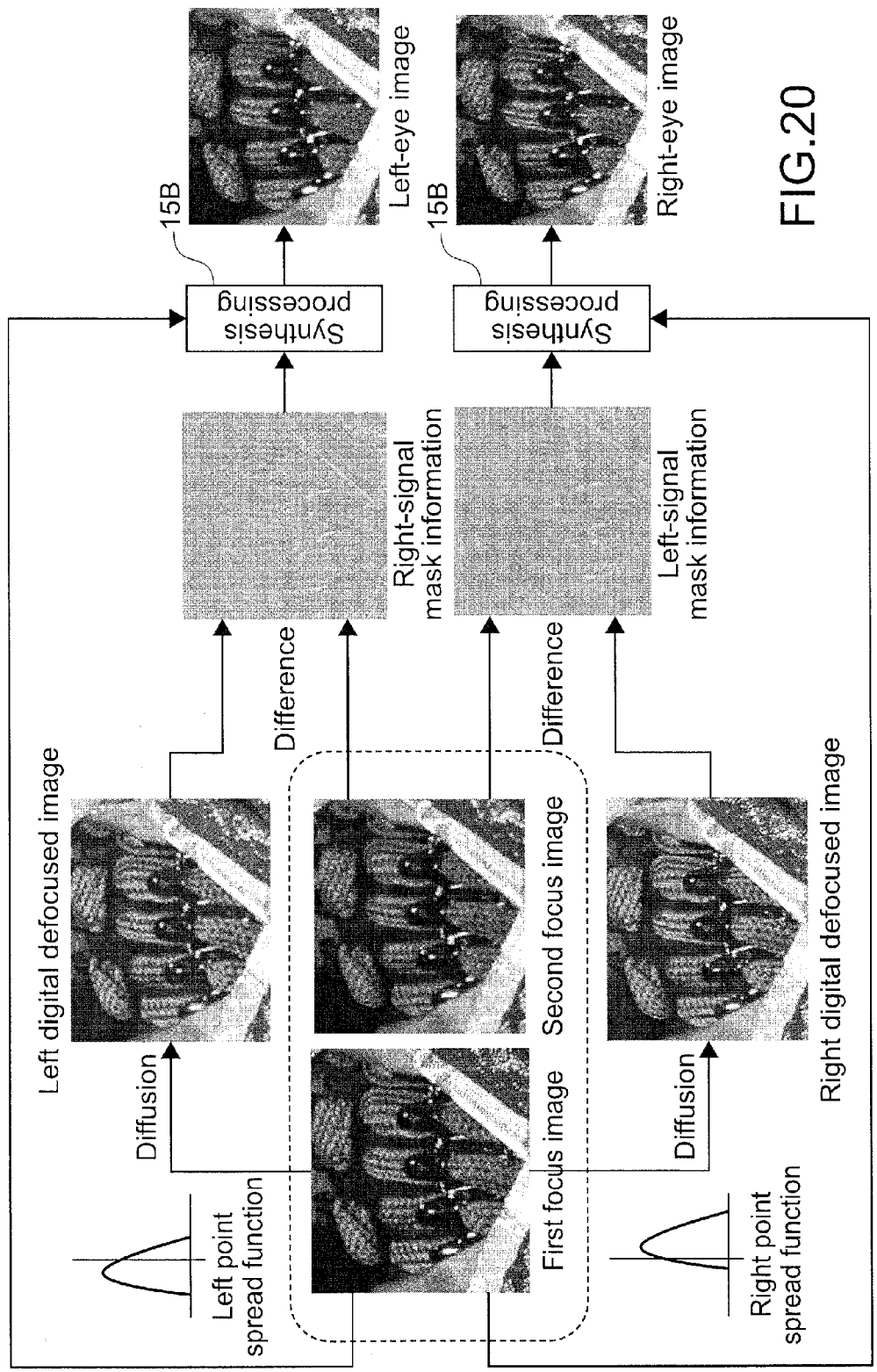
FIG. 20 is a diagram showing a processing flow of a stereoscopic development.

Subsequently, a processing flow of the stereoscopic development will be described. FIG. 20 is a diagram showing a processing flow of the stereoscopic development.

Here, a processing flow after a time point at which the processing of the angle-of-view adjustment unit 10 is terminated will be described. Further, in the processing of generating a stereoscopic image, a generation process of a left-eye image and a generation process of a right-eye image are not different from each other except that the processing for the left and the right are inversed. So, only the processing of the left-eye image will be described below. It should be noted that a left point spread function and a right point spread function are linearly symmetrical with each other.

First, the diffusion processing unit 11C uses the left point spread function, a distribution of which is biased to the left side, for the first focus image to generate a left digital defocused image.

Subsequently, the difference calculation unit 13C acquires a difference value for each pixel between the left digital defocused image and the second focus image to generate right-signal mask information.

Next, the component synthesis processing unit 15B synthesizes the first focus image and the right-signal mask information to develop a left-eye image.

This is the processing flow of the stereoscopic development.

[Stereoscopic Development]

Figure 21:
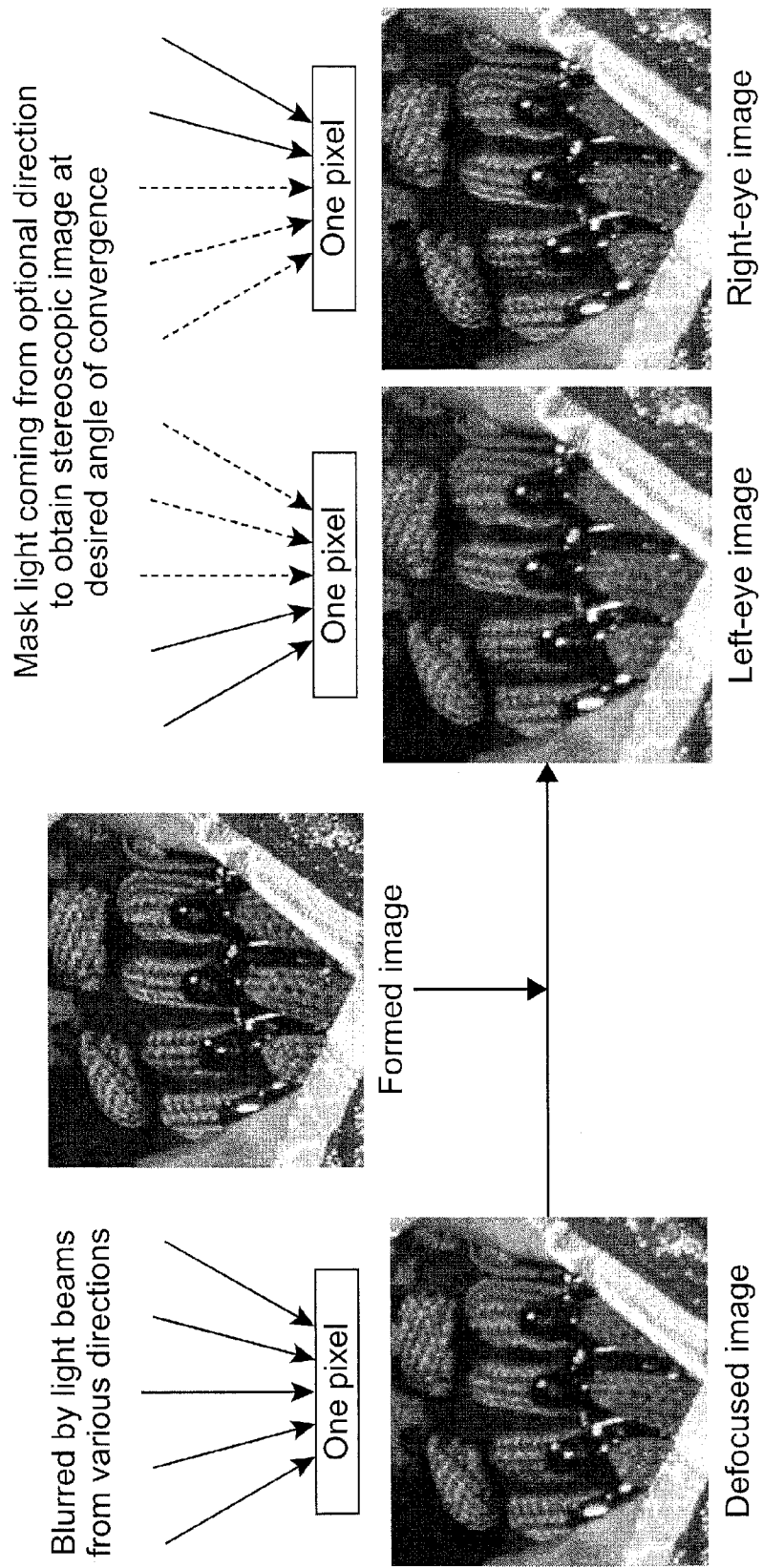
FIG. 21 is a diagram for describing the stereoscopic development.

The defocused image contains information on light coming from a plurality of directions as phase information. By using the formed image to mask light coming from a direction unnecessary for stereoscopic viewing, the light used for the stereoscopic viewing can be separated. This separation can provide a stereoscopic image vertically and horizontally having an optional angle of convergence (stereoscopic effect) (see FIG. 21).

However, the angle of convergence actually obtained depends on a focal length or an aperture of the objective lens 1, and the stereoscopic effect obtained by the stereoscopic development technique according to the embodiment of the present disclosure is almost equal to that obtained by a single-lens beam-splitter stereo camera.

Hereinabove, the third embodiment has been described.

Fourth Embodiment

In the fourth embodiment, as mentioned above, a refocusing development technique using $\Delta\phi$ will be described.

[Overall Configuration]

Figure 22:
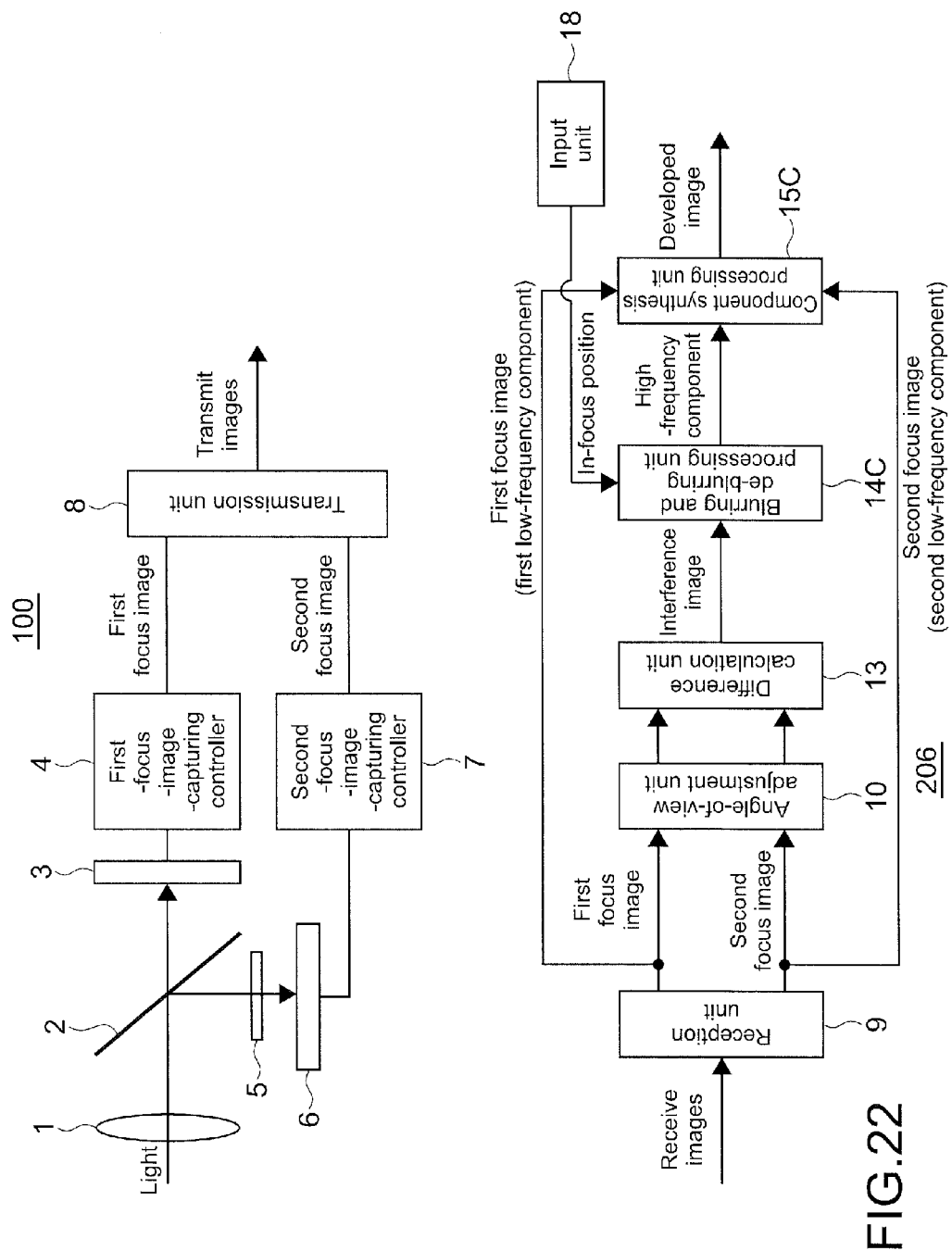
FIG. 22 is a configuration diagram showing an overall configuration of the imaging apparatus and another development apparatus according to another embodiment of the present disclosure.

First, the overall configuration of an imaging apparatus and a development apparatus according to an embodiment of the present disclosure will be described. FIG. 22 is a configuration diagram showing the overall configuration of an imaging apparatus 100 and a development apparatus 206 according to the embodiment of the present disclosure.

The configuration of the imaging apparatus 100 to be used in the fourth embodiment is the same as that of each embodiment described above, and thus description thereof will be omitted.

The main difference on the development apparatus 206 from the embodiments described above is that the diffusion processing unit 11 and the upsampling unit 12 are removed, a blurring and de-blurring processing unit 14C and a component synthesis processing unit 15C are provided with functions described later, and an input unit 18 is additionally provided. In the following description, constituent elements having the same functions as those of the embodiments described above are denoted by the same reference symbols and description thereof will be omitted.

The development apparatus 206 includes a reception unit 9, an angle-of-view adjustment unit 10, a difference calculation unit 13, the blurring and de-blurring processing unit 14C, the component synthesis processing unit 15C, and the input unit 18.

The input unit 18 receives an input of an in-focus position designated by a user. For example, when the user wants to develop an image in which the background of the image is in focus, "Backward" is input, and when the user wants to develop an image in which an object located in the middle of the image is in focus, "Center" is input. When the user wants to develop an image in which the foreground of the image is in focus, "Forward" is input, and when the user wants to develop an image in which all areas are in focus, "Deep focus" is input.

The blurring and de-blurring processing unit 14C estimates an optical path of light by which an image is formed on a focus plane, by using lens characteristics of the objective lens 1 that are learned by the learning-type pattern conversion circuit in advance and based on luminance information and spectral information of the interference image supplied from the difference calculation unit 13 and on a position (in-focus position) to be refocused that is supplied from the input unit 18. Subsequently, based on the spectral information, more specifically, the magnification chromatic aberration, the point spread function is caused to act in an image-diffusing direction or an image-converging direction. Thus, difference information between an image of a low-frequency component and a refocused image as a target is generated. The difference information is necessary for the refocusing development. The processing for the refocusing development by the blurring and de-blurring processing unit 14C will be described later.

The component synthesis processing unit 15C uses the difference information supplied from the blurring and de-blurring processing unit 14C and any one of the first focus image (first low-frequency component) and the second focus image (second low-frequency component) supplied from the reception unit 9 to synthesize a refocused image. The processing for the refocusing development by the component synthesis processing unit 15C will be described later.

Hereinabove, the overall configuration has been described.

[Modified Example of Overall Configuration]

Figure 23:
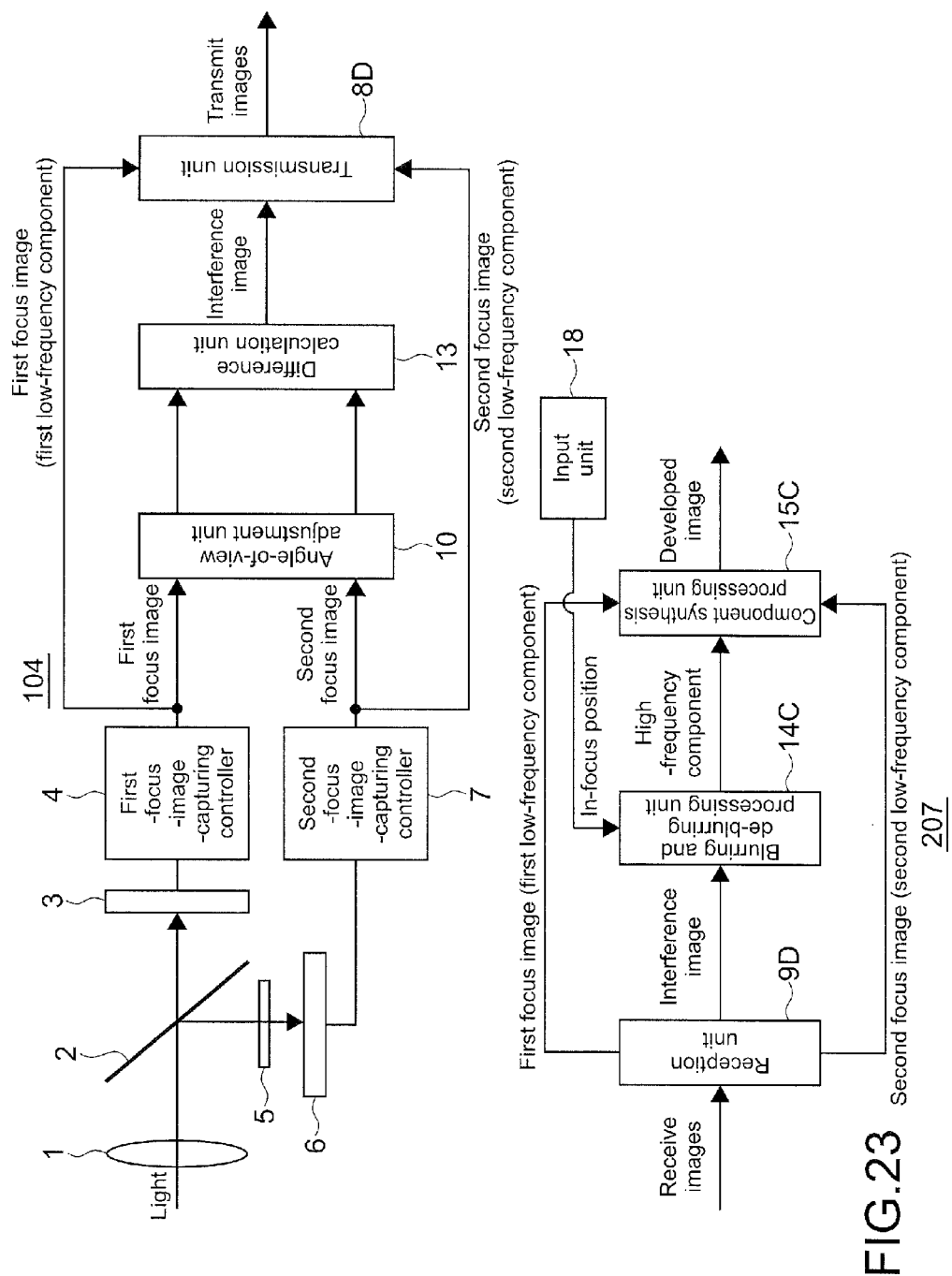
FIG. 23 is a configuration diagram showing an overall configuration of another imaging apparatus and another development apparatus according to the embodiment of the present disclosure.

Next, an imaging apparatus 104 and a development apparatus 207 that have configurations different from the above configurations will be described. FIG. 23 is a configuration diagram showing the overall configuration of the imaging apparatus 104 and the development apparatus 207 according to the embodiment of the present disclosure.

The main difference from the configurations described above is that the angle-of-view adjustment unit 10 and the difference calculation unit 13 of the development apparatus 206 are moved to the imaging apparatus 104 side. It should be noted that description of constituent elements having the same functions as those of the above constituent elements will be omitted.

The imaging apparatus 104 includes an objective lens 1, a half mirror 2, an imaging device 3, a first-focus-image-capturing controller 4, an optical path length change filter 5, an imaging device 6, a second-focus-image-capturing controller 7, the angle-of-view adjustment unit 10, the difference calculation unit 13, and a transmission unit 8D.

The transmission unit 8D transmits the interference image generated by the difference calculation unit 13, the first focus image supplied from the first-focus-image-capturing controller 4, and the second focus image supplied from the second-focus-image-capturing controller 7 to the development apparatus 207.

The development apparatus 207 includes a reception unit 9D, a blurring and de-blurring processing unit 14C, a component synthesis processing unit 15C, and an input unit 18.

The reception unit 9D receives the interference image, the first focus image, and the second focus image that are transmitted from the transmission unit 8D of the imaging apparatus 104. The received interference image is supplied to the blurring and de-blurring processing unit 14C, and the first focus image and the second focus image are supplied to the component synthesis processing unit 15C.

Hereinabove, the modified example of the overall configuration has been described.

[Principles of Refocusing Development]

Subsequently, the principles of the refocusing development will be described. In the refocusing development, an optical path on which the captured image traces after transmitting the objective lens 1 is inversely calculated based on the interference image obtained from the two images with different focuses. Thus, an image can be developed at an optional focus position. The inventor verified by experiments that images equal to those captured with lenses of different characteristics can be developed in a pseudo manner by the refocusing development of, for example, performing refocusing after images are captured or generating a deep-focus image being in focus on the entire image.

Figure 24:
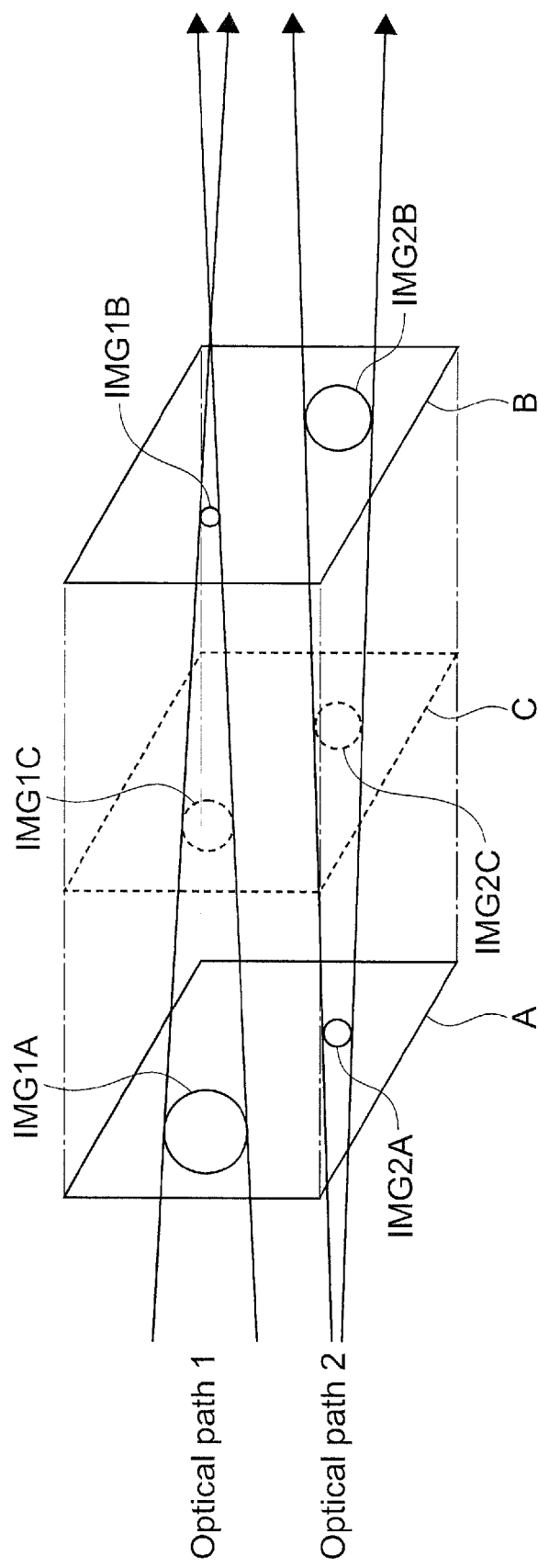
FIG. 24 is a diagram for describing the principles of a refocusing development.

FIG. 24 is a diagram for describing the principles of the refocusing development. A first focus image A includes an image IMG1A and an image IMG2A of a subject. Further, a second focus image B includes an image IMG1B and an image IMG2B of a subject.

For example, since the image IMG1A and the image IMG1B are obtained by imaging the same subject in different focuses, when their outlines are connected, an optical path 1 can be estimated.

Subsequently, a refocusing plane C at a focal position where refocusing is intended to be performed is specified, an image IMG1C after refocusing can be calculated as a plane on which the optical path 1 and the refocusing plane C intersect. In the same manner, an optical path 2 can also be estimated from the image IMG2A and the image IMG2B, and thus an image IMG2C on the refocusing plane C can be calculated.

Hereinabove, the principles of the refocusing development have been described.

(Method of Estimating Optical Path Using Spectral Information of Interference Image)

Next, a method of estimating the optical path based on the interference image in the blurring and de-blurring processing unit 14C will be described. Here, the fact that the spectral information that is also contained in the interference image has to be used to estimate the optical path in addition to the luminance information contained in the interference image will be described.

Figure 25:
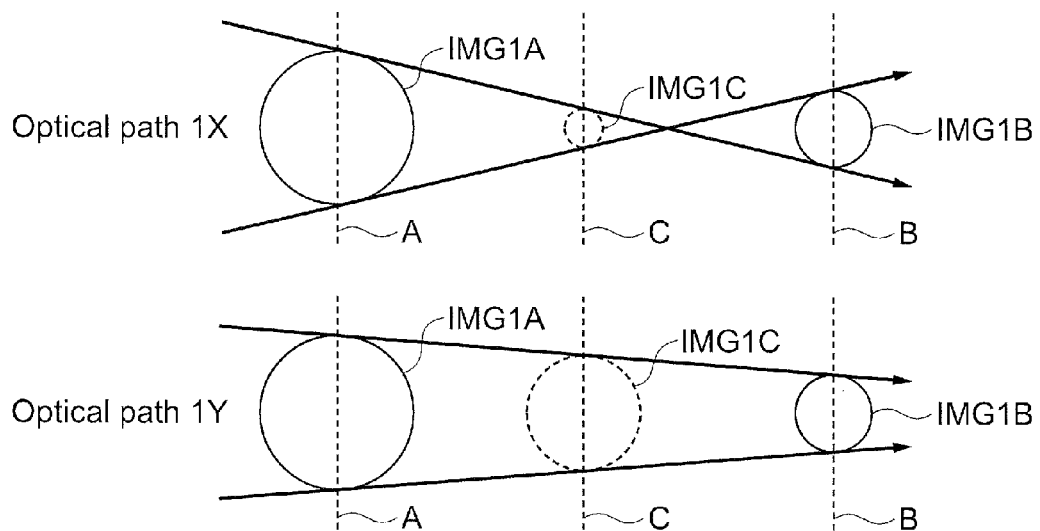
FIG. 25 is a diagram showing a state where an optical path is not estimated by using only luminance information.

First, the fact that the optical path is not estimated by only the luminance information contained in the interference image will be described. FIG. 25 is a diagram showing a state where an optical path is not estimated by using only the luminance information.

FIG. 25 shows the image IMG1A in the first focus image A and the image IMG1B in the second focus image B, as in FIG. 24 used for describing the section of the "Principles of Refocusing development". The size of the image IMG1A and that of the IMG1B can be calculated from the luminance information of the interference image. However, it is difficult to determine, from the size of those two images, whether the optical path is an optical path 1X having an in-focus plane between the first focus and the second focus as shown in the upper part of FIG. 25 or an optical path 1Y having no in-focus plane between the first focus and the second focus as shown in the lower part of FIG. 25. For that reason, as shown in the upper and lower parts of FIG. 25, in the optical path 1X and the optical path 1Y, the size of the image IMG1C obtained on the refocusing plane C is not uniquely determined.

Figure 26:
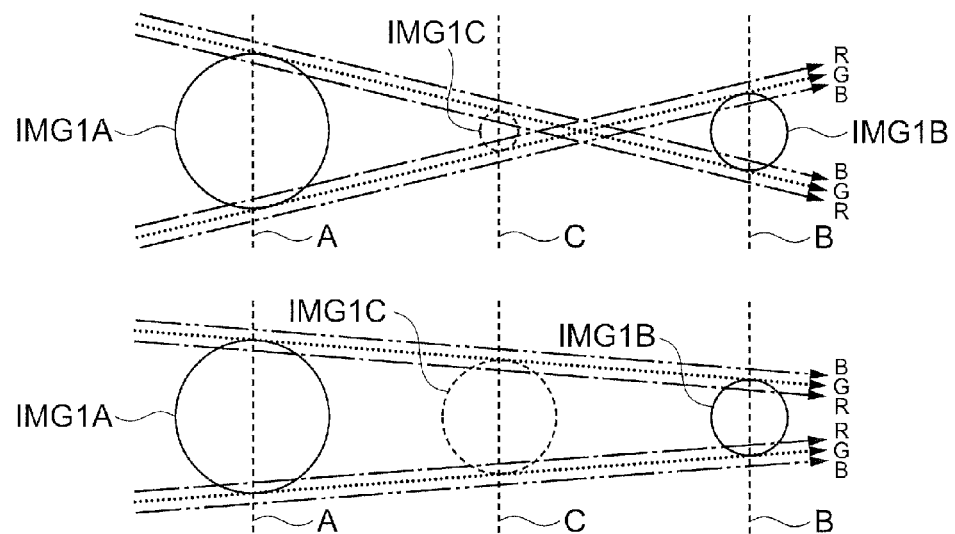
FIG. 26 is a diagram showing a state where the optical path can be estimated by using the luminance information and spectral information.

Subsequently, the fact that the optical path can be estimated by also using the spectral information contained in the interference image will be described. FIG. 26 is a diagram showing a state where the optical path can be estimated by using the luminance information and the spectral information.

FIG. 26 shows the image IMG1A in the first focus image A, the image IMG1B in the second focus image B, the optical path 1X, and the optical path 1Y as shown also in FIG. 25. The difference from FIG. 25 is that a position through which a light beam passes differs depending on wavelengths due to the magnification chromatic aberration in the vicinity of the outlines of the images IMG1A and IMG1B. For easy understanding, FIG. 26 shows red light, green light, and blue light (denoted by R, G, and B, respectively, in FIG. 26) as an example.

Around the image IMG1A, the colors near the outline of the image IMG1A are arranged in the order of R, G, and B from the inner side. In contrast to this, around the image IMG1B, the colors near the outline of the image IMG1B are arranged in the order of B, G, and R from the inner side in the optical path 1X having an in-focus plane between the first focus and the second focus as shown in the upper part of FIG. 26, but conversely arranged in the order of R, G, and B from the inner side in the optical path 1Y as shown in the lower part of FIG. 26.

When color bleeding in the outline of the image, which occurs by the magnification chromatic aberration, is observed in such a manner, it is possible to estimate that the optical path is the optical path 1X or the optical path 1Y.

Hereinabove, the method of estimating the optical path using the spectral information of the interference image has been described.

[Actual Example of In-Focus Position and Magnification Chromatic Aberration]

Figure 27:
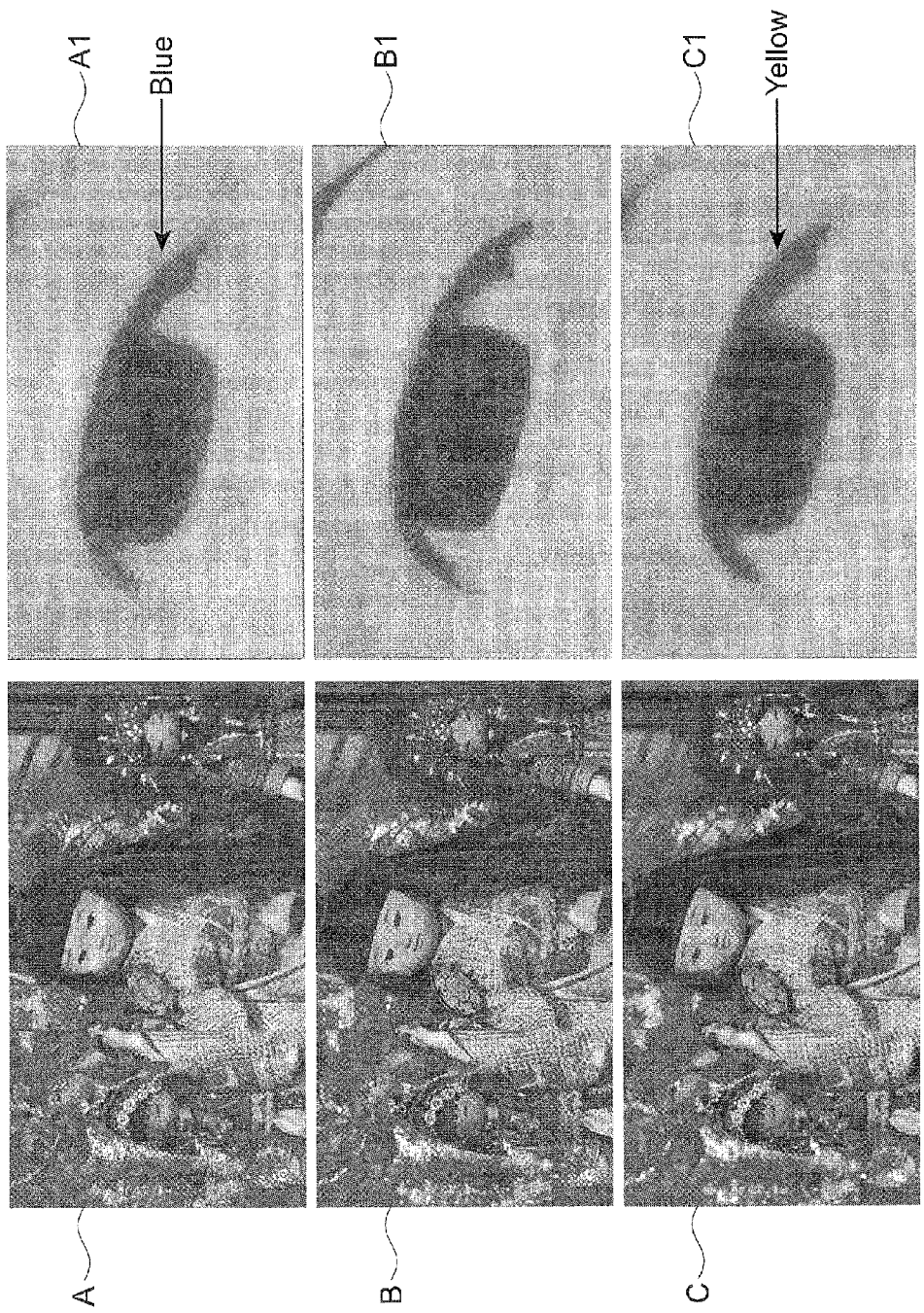
FIG. 27 is a diagram showing a state where a condition of a magnification chromatic aberration differs due to an in-focus position moving backward and forward.

Next, a relationship between the in-focus position and the magnification chromatic aberration to be generated, when an image is captured, will be described using an actual example. FIG. 27 is a diagram showing a state where a condition of the magnification chromatic aberration differs due to the in-focus position moving backward and forward.

An image A is an image in which not a doll appearing at the center but the background is in focus. An image B is an image in which the doll appearing at the center is in focus. An image C is an image in which not the doll appearing at the center but the front side is in focus. Further, each of images A1, B1, C1 is obtained by enlarging the part of an eye of the doll appearing at the center of each of the images A, B, and C, respectively.

In the image B1, the doll is in focus and the color bleeding due to the magnification chromatic aberration is not recognized at the eye part. In contrast to this, in the image A1, the backward of the doll is in focus, and in the eye part, particularly in the outline of the upper eyelid, color bleeding of the blue color occurs. Additionally, in the image C1, the forward of the doll is in focus, and in the eye part, particularly in the outline of the upper eyelid, color bleeding of the yellow color occurs.

As described above, the image A1 and the image C1 have the same degree of defocusing from the image B1, but have different color bleeding due to the magnification chromatic aberration. For that reason, it is possible to determine, based on the different color bleeding, whether the in-focus position is located forward or backward of the image even when the image A1 and the image C1 have the same degree of blurring.

Hereinabove, the actual example of the relationship between the in-focus position and the magnification chromatic aberration to be generated, when an image is captured, has been described.

[Examples of Spectral Information Contained in Interference Image and Use of Point Spread Function]

Figure 28:
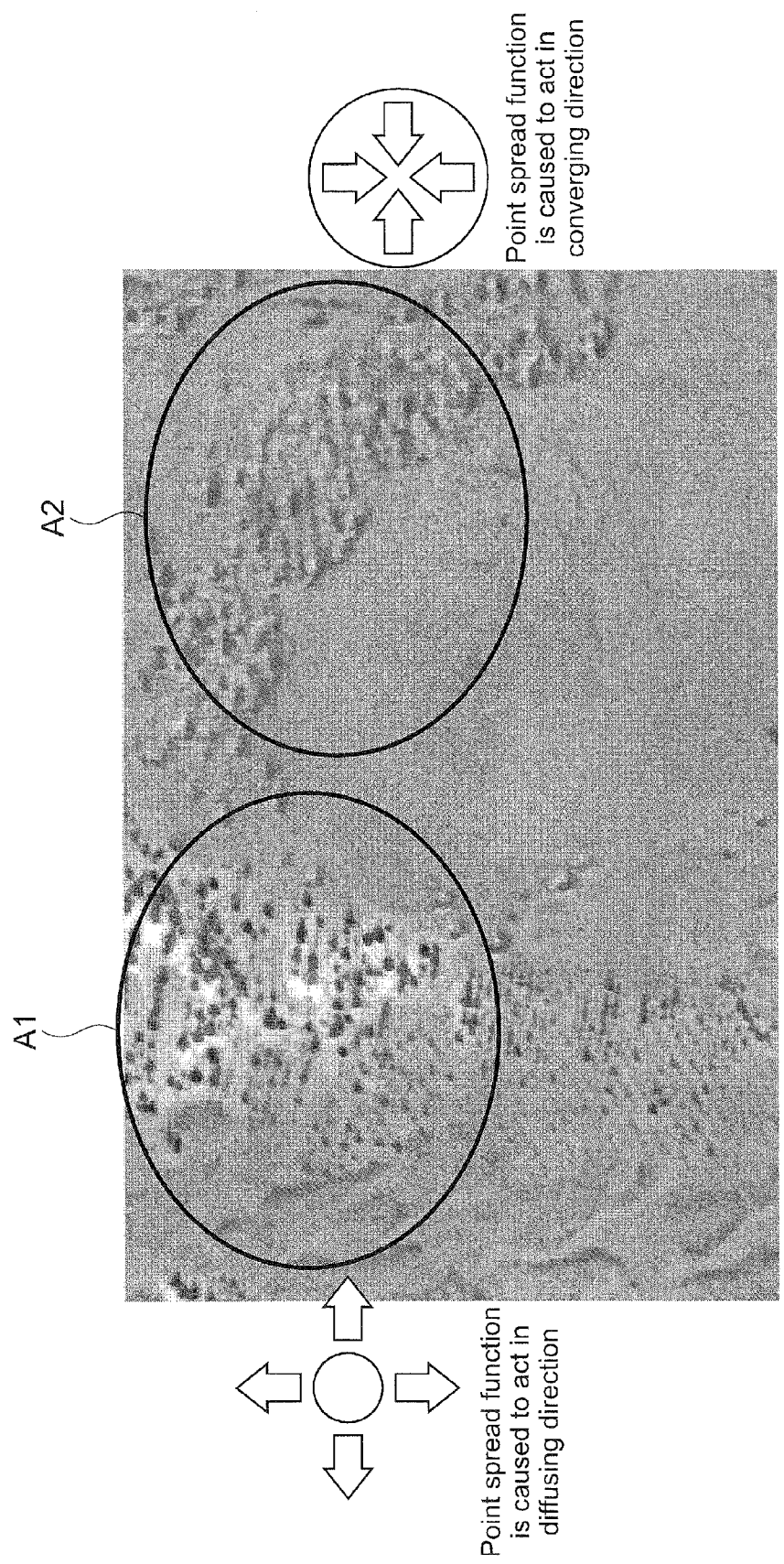
FIG. 28 is a diagram showing examples of the spectral information in the interference image and showing how the point spread function is caused to act in a diffusing or converging direction for each example.

Next, examples of the spectral information contained in the interference image are shown, and how the point spread function is caused to act (in an image-diffusing direction or an image-converging direction) is shown in each example. FIG. 28 is a diagram showing examples of the spectral information in the interference image and showing how the point spread function is caused to act in a diffusing or converging direction for each example.

In FIG. 28, color bleeding in blue is recognized due to the magnification chromatic aberration in an image appearing in an area A1. For the image in which the color bleeding in blue is observed, the point spread function is caused to act in the image-diffusing direction, that is, in a defocus direction.

Further, color bleeding in yellow is recognized due to the magnification chromatic aberration in an image appearing in an area A2. For the image in which the color bleeding in yellow is observed, the point spread function is caused to act in the image-converging direction, that is, in an in-focus direction.

In such a manner, in the interference image, the difference in color due to the magnification chromatic aberration can be determined, and when information on such a difference is learned by the learning-type pattern conversion circuit of the blurring and de-blurring processing unit 14C, it is possible to determine whether the image in the interference image is developed in the diffusing direction or the converging direction.

With this determination, an image that is refocused to an optional focus position can be developed based on the two images with different focuses.

Hereinabove, the examples of the spectral information contained in the interference image and the use of the point spread function have been described.

[Actual Examples of Refocusing Development]

Figure 29:
FIG. 29 is a diagram showing an example of an image in which not a doll but a background is in focus.

Next, actual examples of the refocusing development will be described. FIG. 29 is a diagram showing an example of an image in which not a doll but a background is in focus. This image is the first image to be used in the refocusing development and corresponds to the first focus image. In this image, not the doll appearing at the center but the background is in focus.

Figure 30:
FIG. 30 is a diagram showing an example of an image in which not the doll but a front side is in focus.

FIG. 30 is a diagram showing an example of an image in which not the doll but a front side is in focus. This image is the second image to be used in the refocusing development and corresponds to the second focus image. In this image, not the doll appearing at the center but the forward is in focus and the entire image is defocused.

Figure 31:
FIG. 31 is a diagram showing an example of a refocused image obtained by performing the refocusing development on the images shown in FIGS. 29 and 30 to develop an image with the doll being in focus.

FIG. 31 is a diagram showing an example of a refocused image obtained by performing the refocusing development on the images shown in FIGS. 29 and 30 to develop an image with the doll being in focus. In this example, an image in which the background is blurred and the doll at the center is in focus can be developed.

Figure 32:
FIG. 32 is a diagram showing an example of a deep-focus image obtained by performing the refocusing development on the images shown in FIGS. 29 and 30 to develop an image with the doll and the background being in focus.

FIG. 32 is a diagram showing an example of a deep-focus image obtained by performing the refocusing development on the images shown in FIGS. 29 and 30 to develop an image with the doll and the background being in focus. Using the refocusing development in such a manner, a deep-focus image in which subjects at a plurality of different distances are focused can also be developed.

Hereinabove, the actual examples of the refocusing development have been described.

Fifth Embodiment

Next, an embodiment in which the high resolution development is performed without the defocus mechanism will be described. In this embodiment, magnification chromatic aberration correction processing is used instead of the defocus processing. A system for performing the magnification chromatic aberration correction processing is already put to practical use and installed in products, so the high resolution development can be implemented by only slightly correcting existing products.

[Overall Configuration]

Figure 33:
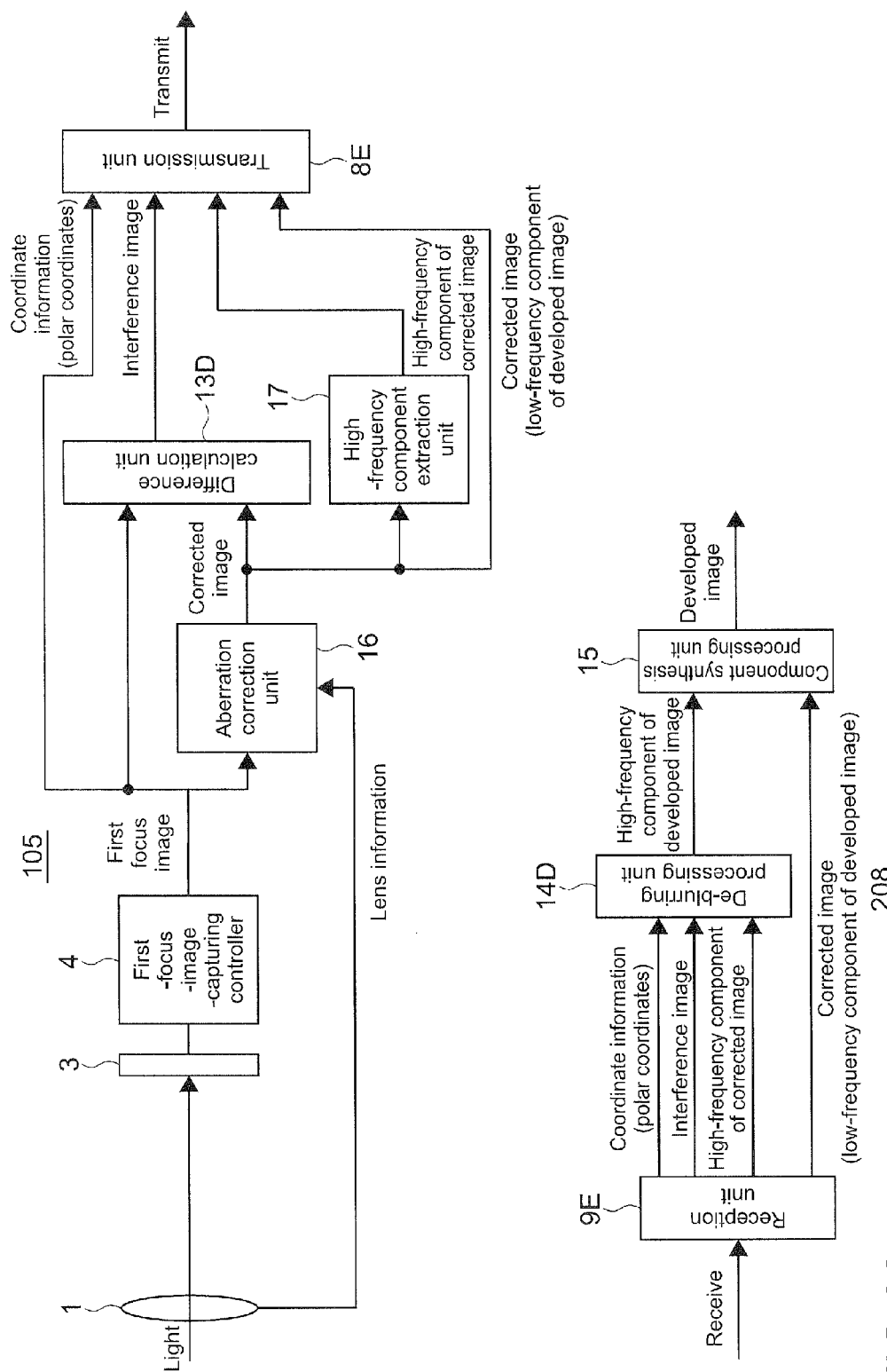
FIG. 33 is a configuration diagram showing an overall configuration of another imaging apparatus and another development apparatus according to another embodiment of the present disclosure.

First, the overall configuration of an imaging apparatus and a development apparatus according to an embodiment of the present disclosure will be described. FIG. 33 is a configuration diagram showing the overall configuration of an imaging apparatus 105 and a development apparatus 208 according to the embodiment of the present disclosure. It should be noted that constituent elements having the same functions as those of the above constituent elements are denoted by the same reference symbols and description thereof will be omitted.

The imaging apparatus 105 includes an objective lens 1, an imaging device 3, a first-focus-image-capturing controller (imaging unit) 4, an aberration correction unit (correction unit) 16, a difference calculation unit 13D, a high-frequency component extraction unit 17, and a transmission unit 8E.

The aberration correction unit 16 acquires lens information on focus, zoom, and the like of the objective lens 1 and corrects a magnification chromatic aberration of a formed image based on the acquired lens information by a generally-known magnification chromatic aberration correction method.

Specifically, a shift between an R channel and a G channel and a shift between a B channel and the G channel are corrected by digital processing. This step of correcting the shift produces substantially the same effects as the defocus step, and thus the correction of the magnification chromatic aberration allows the high resolution development to be performed without performing the defocus processing. It should be noted that the magnification chromatic aberration is described here, but the present disclosure is not limited thereto and a spherical aberration, a coma aberration, and the like may be corrected. Further, the image may be subjected to a digital optical correction such as digital de-blurring processing. The image generated here is an image on which at least one of the aberration correction and the digital optical correction is performed.

It should be noted that an image on which the magnification chromatic aberration correction is performed is hereinafter referred to as a corrected image. The corrected image is output to the difference calculation unit 13D so as to generate an interference image, output to the high-frequency component extraction unit 17 so as to extract a high-frequency component, and output to the transmission unit 8E so as to be used in component synthesis processing in the development apparatus 208.

The difference calculation unit 13D calculates a difference for each pixel between the input first focus image and corrected image, generates an interference image, and outputs the interference image to the transmission unit 8E.

The high-frequency component extraction unit 17 extracts only a high-frequency component from the corrected image by Wavelet transform or the like. The extraction method is not limited to the Wavelet transform and may be any method as long as the high-frequency component can be extracted. The extracted high-frequency component of the corrected image is transmitted to the transmission unit 8E so as to be used in a de-blurring processing unit 14D of the development apparatus 208.

The transmission unit 8E transmits, to the development apparatus 208, coordinate information included in the first focus image, the interference image, the high-frequency component of the corrected image, and the corrected image. The coordinate information described here is obtained by replacing X-Y coordinate information of the first focus image with a polar coordinate system (r-θ) with the center image of the first focus image being as the center. The polar coordinate system is used because the magnification chromatic aberration is concentrically generated based on the center of the image. This information is used for converging the learning in a learning-type pattern conversion circuit of the de-blurring processing unit 14D.

The development apparatus 208 includes a reception unit 9E, the de-blurring processing unit 14D, and a component synthesis processing unit 15.

The reception unit 9E receives the coordinate information, the interference image, the high-frequency component of the corrected image, and the corrected image from the transmission unit 8E of the imaging apparatus 105, and outputs the coordinate information, the interference image, and the high-frequency component of the corrected image to the de-blurring processing unit 14D and outputs the corrected image to the component synthesis processing unit 15.

The de-blurring processing unit 14D receives inputs of the coordinate information, the interference image, and the high-frequency component of the corrected image to perform the learning in the learning-type pattern conversion circuit so as to inversely calculate the high-frequency component of an image to be developed. For example, in the case where the first focus image is an HD size image, the high-frequency component of a 4K size image is generated by the de-blurring processing. In the case where the first focus image is a 4K size image, the high-frequency component of an 8K size image is generated. The generated high-frequency component of the developed image is output to the component synthesis processing unit 15. Aberration difference information of the magnification chromatic aberration contained in the interference image and the high-frequency component of the corrected image are input to the learning-type pattern conversion circuit on a pixel-by-pixel basis to perform processing.

Hereinabove, the overall configuration has been described. It should be noted that the aberration correction unit 16, the difference calculation unit 13D, and the high-frequency component extraction unit 17 are included in the imaging apparatus 105 in the above configuration. However, all of those components may be included in the development apparatus 208, the aberration correction unit 16 may be included in the imaging apparatus 105, and the aberration correction unit 16 and the difference calculation unit 13D may be included in the imaging apparatus 105.

[Specific Examples]

Next, an example in which the high resolution development is performed using the high resolution development technique according to the embodiment of the present disclosure will be described.

Figure 34:
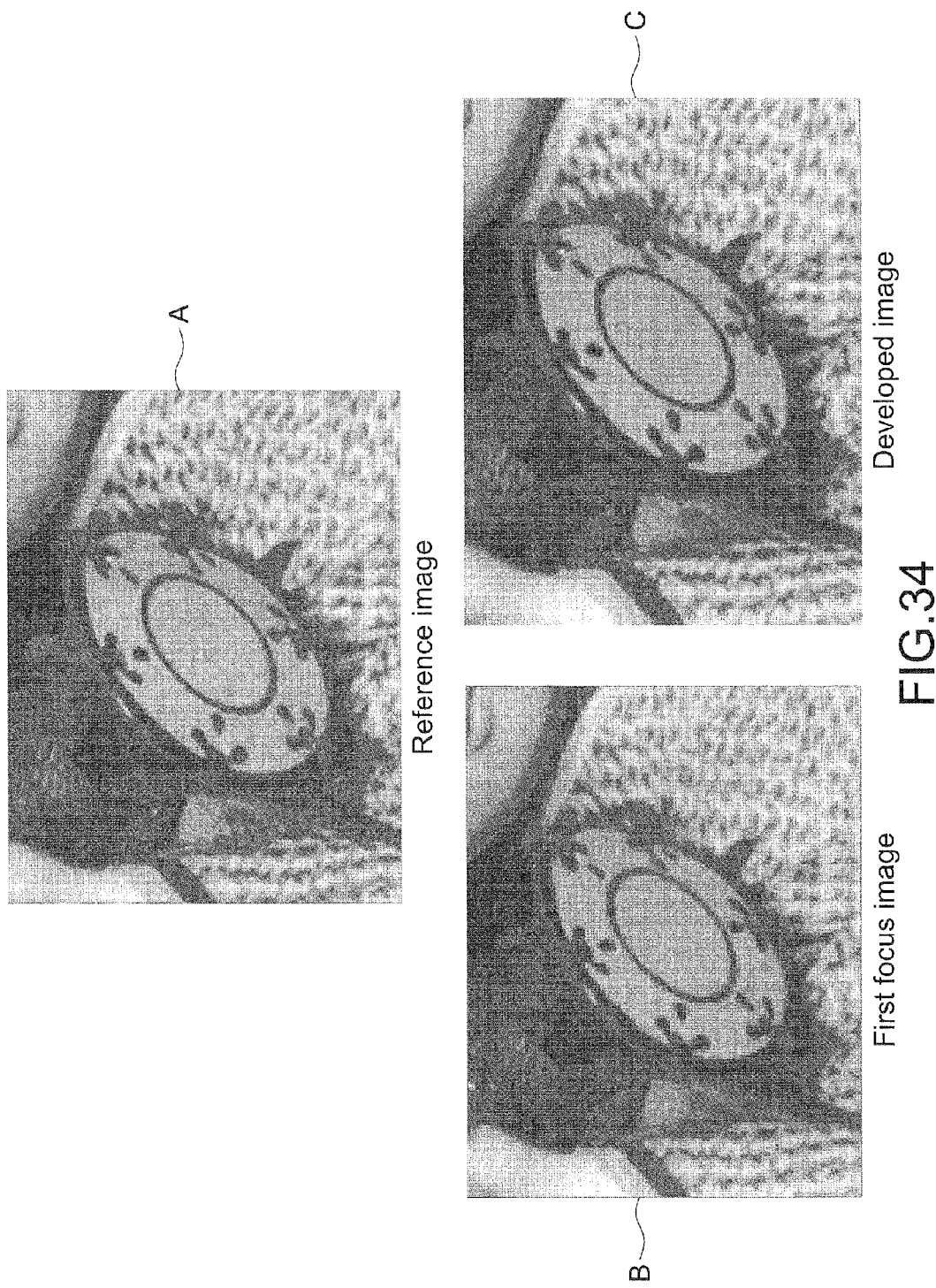
FIG. 34 is a diagram showing that a 4K image as a reference is used to generate a first focus image, and the high resolution development is performed on the first focus image to generate a developed image.

FIG. 34 is a diagram showing that a 4K image A as a reference is used to generate a first focus image B, and the high resolution development is performed on the first focus image B to generate a developed image C. Comparing the reference 4K image A with the developed image C, it is found that there is not a large difference therebetween.

Sixth Embodiment

In the first embodiment and the fifth embodiment described above, the holographic development to achieve high resolution in a spatial direction by using the interference image generated from the first focus image (formed image) and the second focus image (defocused image) has been described.

In contrast to this, in this embodiment, a high frame rate development technique in which the theory of the holographic development is broadened in a time direction to increase a frame rate of a captured moving image will be described.

Figure 35:
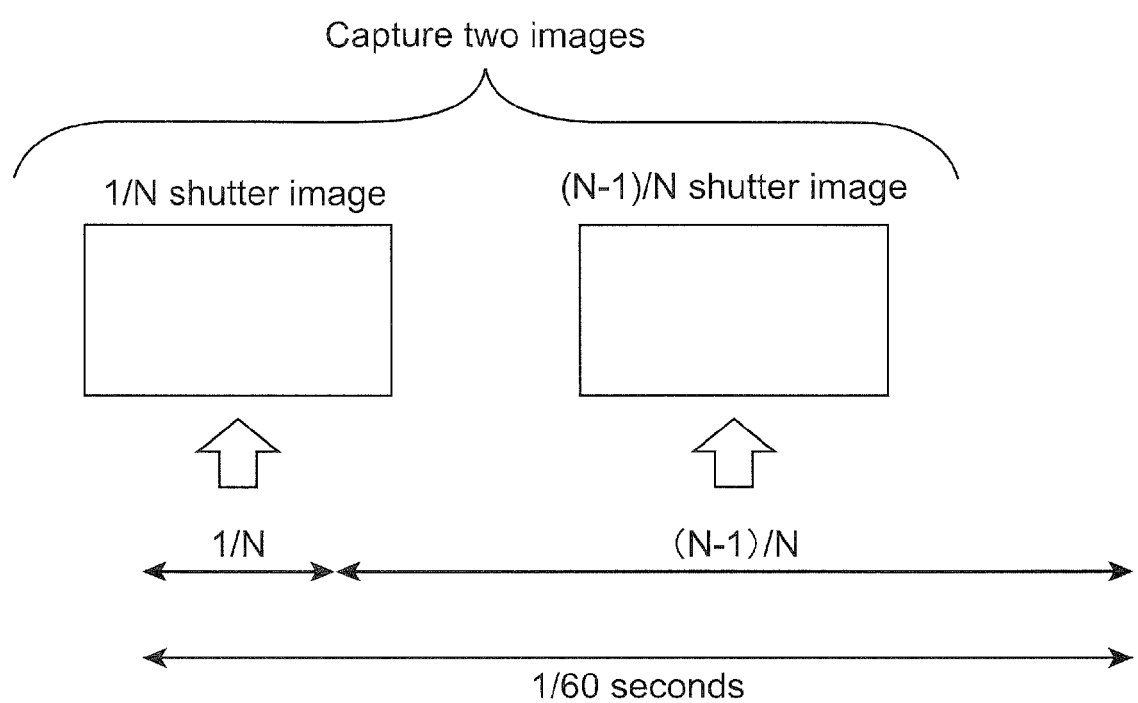
FIG. 35 is a diagram showing a relationship between a normal shutter speed of 1/60 seconds, an image captured at 1/N of the normal shutter speed, and an image captured at a shutter speed of (N−1)/60N seconds obtained by subtracting 1/60N seconds from 1/60 seconds.

In the high frame rate development, as shown in FIG. 35, an image captured at a shutter speed of 1/60N seconds is used. The shutter speed of 1/60N seconds is based on a normal shutter speed of 1/60 seconds and is 1/N of that shutter speed (N is positive number). This image is referred to as a 1/N shutter image.

Additionally, an image captured at a shutter speed of (N−1)/60N seconds is also used. The shutter speed of (N−1)/60N seconds is the remaining time obtained by subtracting the 1/60N seconds from the 1/60 seconds. This image is referred to as an (N−1)/N shutter image. Those two images are subjected to the high frame rate development to develop a high frame rate video equivalent to a video captured at an Nx-speed, that is, at a high shutter speed of 1/60N seconds.

This technique has an advantage that a high frame rate video can be generated with a camera capable of processing image data of a total of two images in 1/60 seconds by shutter control without using a camera exclusively used for a high frame rate. The total of two images are an image of an HD resolution that is captured at a shutter speed of 1/60N seconds and an image of an HD resolution that is captured at a shutter speed of (N−1)/60N seconds.

In this technique, however, an extremely high frame rate causes a large increase in block noise, and thus the frame rate for development is limited. Further, the resolution of a generated video is also affected by the dynamic range of the imaging device.

[Principles of High Frame Rate Development]

Figure 36:
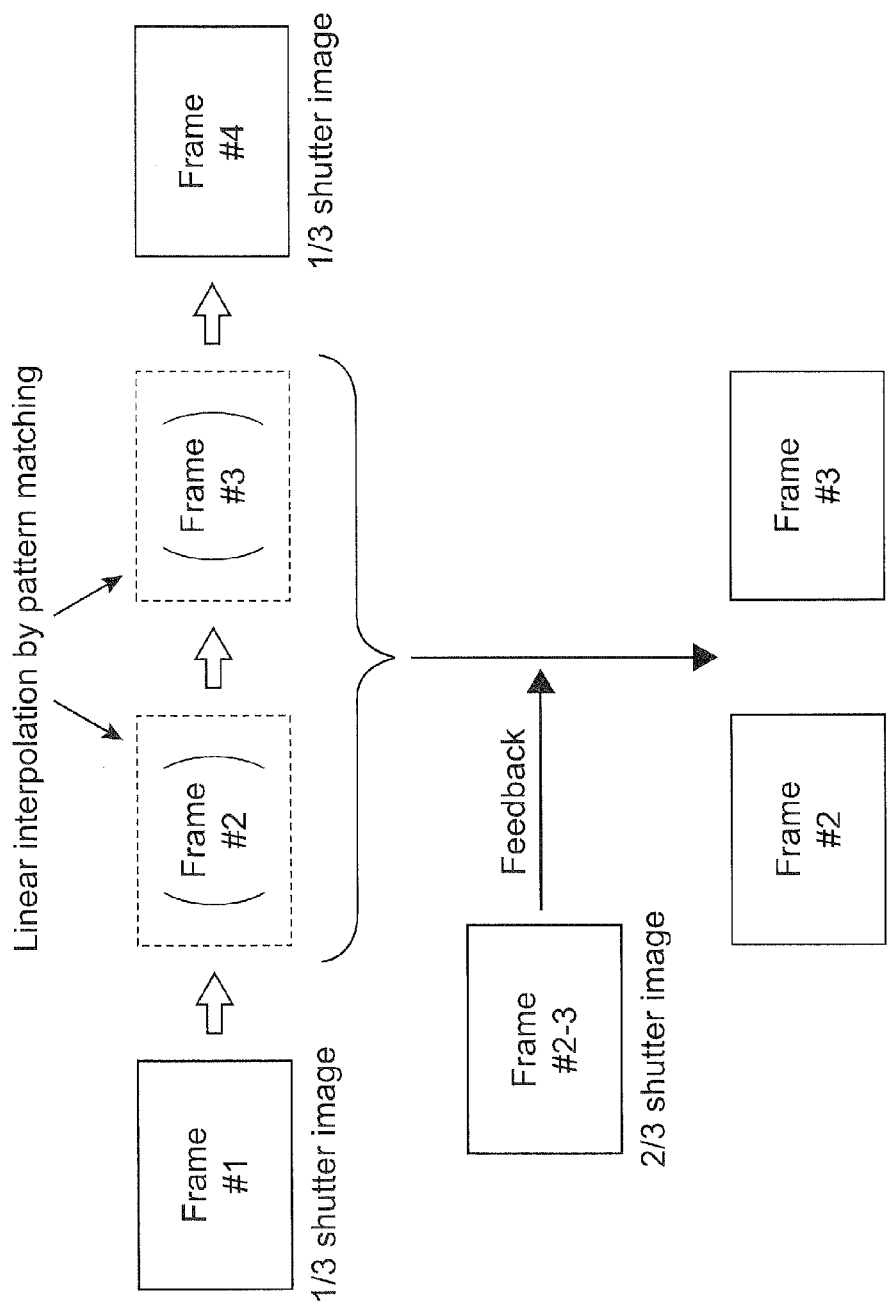
FIG. 36 is a diagram for describing the principles of a high frame rate development.

Next, the principles of the high frame rate development will be described. Here, the case where N=3 is described as an example. FIG. 36 is a diagram for describing the principles of the high frame rate development. Here, two types of images captured in 1/60 seconds are referred to as a 1/3 shutter image and a 2/3 shutter image.

Based on a frame number of an 3x-speed image to be developed, the frame of an image to be captured is hereinafter referred to as follows as appropriate. First, a first frame (Frame #1) of the 1/3 shutter image is captured, and second to third frames of the 2/3 shutter image (Frames #2 to 3; corresponding to the second and third frames of the 3x-speed image) are Subsequently captured. Next, a fourth frame (Frame #4) of the 1/3 shutter image is captured, and fifth to sixth frames of the 2/3 shutter image are captured in the stated order.

(Generation of Pseudo-Interpolation Frame)

In the case where the 3x-speed image is developed from the 1/3 shutter image and the 2/3 shutter image, first, an amount of a movement between the first frame and the fourth frame of the 1/3 shutter image is analyzed.

Subsequently, one image of the first frame and the fourth frame is simply moved in its moving direction based on the amount of the movement between those frames by using linear interpolation by pattern matching. By the linear interpolation, pseudo-interpolation frames corresponding to a second frame (Frame #2) and a third frame (Frame #3) of the 3x-speed image are generated.

(Calculation of Interpolation Error)

Since the interpolation is performed by a simple linear movement in the two interpolation frames, a rotational movement or an accelerating movement of the subject, a movement in a depth direction of the screen, and the like are not precisely interpolated. For that reason, in the image of the interpolated frame, many interpolation errors occur in an edge portion.

If those two pseudo-interpolation frames can be ideally interpolated, a combined value of those two interpolation frames has to be equal to the second to third frames of the 2/3 shutter image.

However, the interpolation is not ideally performed, and thus a difference between the combined value of those two interpolation frames and images of the second to third frames of the 2/3 shutter image is generated. In this regard, this difference is used to acquire a cumulative total value of the errors corresponding to the two pseudo-interpolation frames. The cumulative total value of the errors is to be an interference image.

(Learning in Learning-Type Pattern Conversion Circuit)

The second frame and third frame generated as the pseudo-interpolation frames are generated by the linear interpolation by simply moving one image of the first and fourth frames in its moving direction based on the amount of the movement between the frames.

For that reason, those pseudo-second and third frames and the second and third frames actually captured with a camera of a 3×-speed high frame rate have a correlation in error.

Actually, the following tendency is observed: in the same coordinates of the corresponding frames, errors with the same tendency occur and a larger movement amount increases errors.

A relationship between the tendency of error generation in the pseudo-interpolation frames and the interference image that is the cumulative total value of the errors is learned in the learning-type pattern conversion circuit, so that the error amount in each interpolation frame can be corrected.

(Allocation of Amount of Error Correction)

Allocation of the amount of error correction to the second frame and the third frame that are the pseudo-interpolation frames can be performed because there is a certain tendency in the generation of the errors of those two frames.

The allocation of the amount of error correction is feasible because the pseudo-interpolation frames are generated by simply moving in parallel a frame (first frame or fourth frame) of one 1/3 shutter image. If an average between the two frames of the first frame and the fourth frame is obtained and interpolation is performed, a certain tendency in the generation of the errors does not occur and an appropriate allocation of the amount of error correction becomes difficult to perform.

(Notes of Correction)

Notes of the correction in the high frame rate development reside in that the priority is given not to obtain a high-quality interpolation frame but to perform interpolation so as to obtain errors of the same tendency, in the stage of generating the pseudo-interpolation frames. The error correction for obtaining a high-quality interpolation frame is performed anew using the interference image at the last of the high frame rate development.

[Configuration of Imaging Apparatus]

Figure 37:
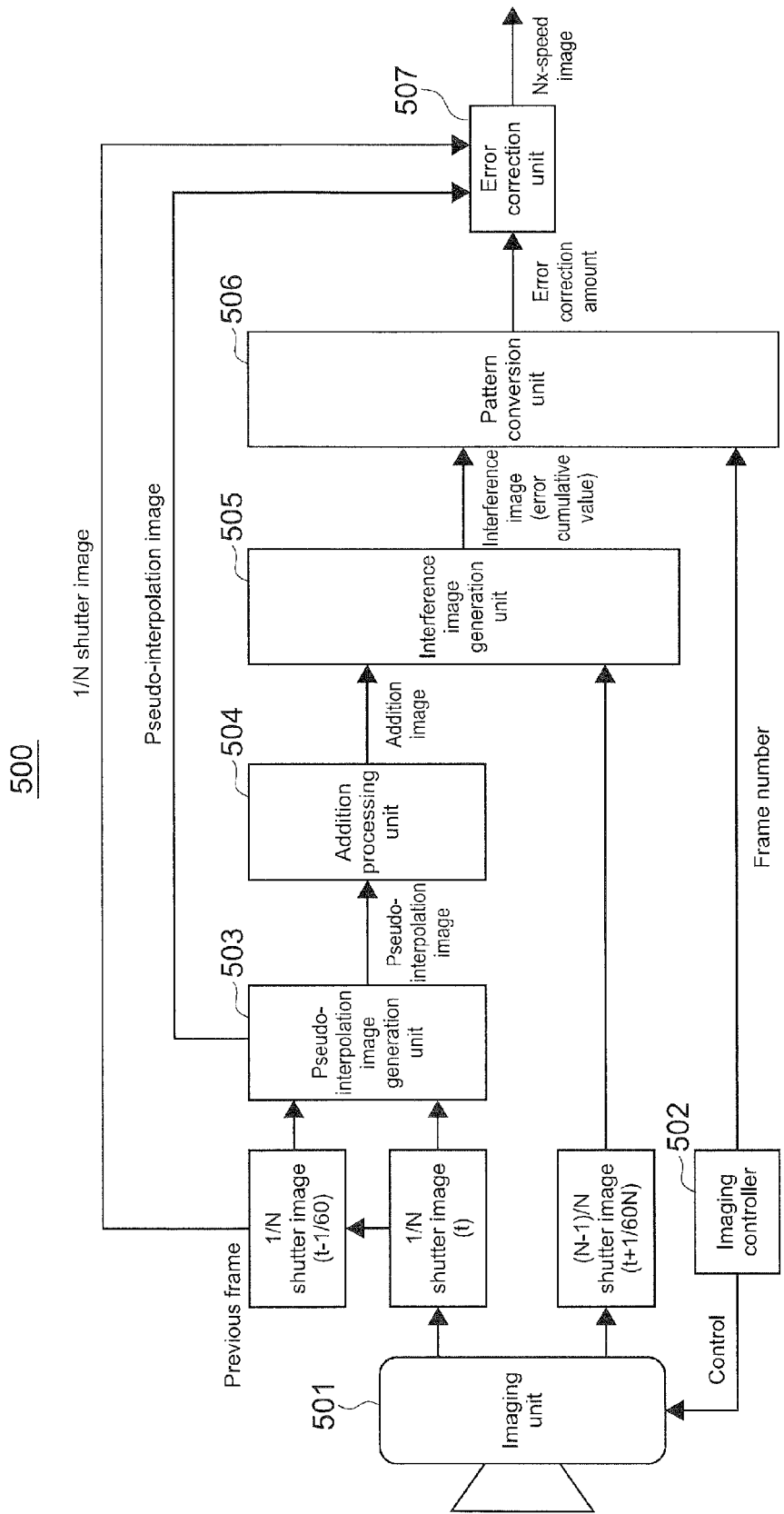
FIG. 37 is a functional block diagram showing a configuration of another imaging apparatus.

Next, the configuration of an imaging apparatus for performing the high frame rate development will be described. FIG. 37 is a functional block diagram showing the configuration of an imaging apparatus 500.

The imaging apparatus 500 includes an imaging unit 501, an imaging controller 502, a pseudo-interpolation image generation unit 503, an addition processing unit 504, an interference image generation unit 505, a pattern conversion unit 506, and an error correction unit 507.

The imaging unit 501 captures an image at a shutter speed of 1/60N seconds and an image at a shutter speed of (N−1)/60N seconds, per 1/60 seconds.

The imaging controller 502 controls the imaging unit 501 to capture an image at a predetermined shutter speed and notifies the pattern conversion unit 506 of a frame number of a captured image (frame). This is because the pattern conversion unit 506 allocates different errors for each frame and thus needs the frame number.

The pseudo-interpolation image generation unit 503 receives inputs of two images captured at a 1/N shutter image, that is, an image captured at time t and an image captured at time t-1/60 (for example, the first frame and the fourth frame when N=3), and performs a movement analysis using those two images. It should be noted that the imaging apparatus 500 includes a frame memory for storing the image captured at time t and the image captured at time t-1/60.

The pseudo-interpolation image generation unit 503 performs linear interpolation to generate (N−1) pieces of pseudo-interpolation images. The pseudo-interpolation image generation unit 503 supplies the generated pseudo-interpolation images to the addition processing unit 504 and the error correction unit 507.

The addition processing unit 504 adds the (N−1) pieces of pseudo-interpolation images supplied from the pseudo-interpolation image generation unit 503 to be integrated into one addition image. Subsequently, the addition processing unit 504 supplies the integrated addition image to the interference image generation unit 505.

The interference image generation unit 505 receives inputs of the addition image and the (N−1)/N shutter image to calculate a difference between those two images. The difference is supplied to the pattern conversion unit 506 as an interference image (error cumulative value).

The pattern conversion unit 506 includes a learning-type pattern conversion circuit. In the learning-type pattern conversion circuit, as described above, a relationship between the tendency of error generation in the pseudo-interpolation frames and the interference image as the error cumulative value is obtained in advance through learning. The pattern conversion unit 506 generates an error correction amount of each frame by using the interference image supplied from the interference image generation unit 505 and the frame number supplied from the imaging controller 502. The pattern conversion unit 506 supplies the generated error correction amount to the error correction unit 507.

The error correction unit 507 applies the error correction amount supplied from the pattern conversion unit 506 to the pseudo-interpolation images supplied from the pseudo-interpolation image generation unit 503 to correct the errors, and generates (N−1) pieces of frames that form an Nx-speed image. The error correction unit 507 forms perfect N pieces of frames together with the 1/N shutter image acquired from the imaging unit 501 and outputs the image.

Hereinabove, the configuration of the imaging apparatus 500 has been described.

[Another Configuration of Present Disclosure]

It should be noted that the present disclosure can have the following configurations.

(1) An imaging apparatus, including:

an imaging unit configured to capture two images that are different from each other by a predetermined amount of an optical distance (focus) between an objective lens and an imaging device having a first resolution; and a transmission unit configured to transmit the captured images.

(2) The imaging apparatus according to (1), in which the imaging unit includes
a formed-image-capturing device configured to capture a formed image on which light passing through the objective lens is focused, and
a defocused-image-capturing device configured to capture a defocused image on which the light is defocused based on the predetermined amount.

(3) The imaging apparatus according to (1), further including:
an angle-of-view adjustment unit configured to equalize angles of view of the two images, one of the two images being a first focus image and the other image being a second focus image;
a diffusion unit configured to generate, as a digital defocused image, an image obtained by diffusing and enlarging the first focus image to have a second resolution higher than the first resolution;
an upsampling unit configured to generate, as an enlarged defocused image, an image obtained by upsampling the second focus image to have the second resolution; and
a difference calculation unit configured to generate, as an interference image, a difference for each pixel between the digital defocused image and the enlarged defocused image, in which
the transmission unit is configured to transmit the first focus image and the interference image.

(4) The imaging apparatus according to (1), further including:
an angle-of-view adjustment unit configured to equalize angles of view of the two images, one of the two images being a first focus image and the other image being a second focus image;
a diffusion unit configured to generate, as a digital defocused image, an image obtained by diffusing the first focus image; and
a difference calculation unit configured to generate, as an interference image, a difference for each pixel between the digital defocused image and the second focus image, in which
the transmission unit is configured to transmit the first focus image and the interference image.

(5) The imaging apparatus according to (3) or (4), in which
the diffusion unit is configured to diffuse the formed image by a point spread function.

(6) The imaging apparatus according to (1), further including:
an angle-of-view adjustment unit configured to equalize angles of view of the two images, one of the two images being a first focus image and the other image being a second focus image;
a diffusion unit configured to generate, as a first digital defocused image, an image obtained by diffusing the first focus image by a first function and generate, as a second digital defocused image, an image obtained by diffusing the first focus image by a second function, the first function and the second function being linearly symmetrical with each other; and
a difference calculation unit configured to generate, as first mask information, a difference for each pixel between the first digital defocused image and the second focus image and generate, as second mask information, a difference for each pixel between the second digital defocused image and the second focus image, in which
the transmission unit is configured to transmit the first focus image, the first mask information, and the second mask information.

(7) The imaging apparatus according to (1), further including:
an angle-of-view adjustment unit configured to equalize angles of view of the two images, one of the two images being a first focus image and the other image being a second focus image; and
a difference calculation unit configured to generate, as an interference image, a difference for each pixel between the first focus image and the second focus image, in which
the transmission unit is configured to transmit the first focus image, the second focus image, and the interference image.

(8) The imaging apparatus according to any one of (3) to (7), in which
the first focus image is a formed image that is in focus, and
the second focus image is a defocused image that is defocused by a predetermined amount from the in-focus position.

(9) An imaging apparatus, including:
an imaging unit configured to capture an image;
a correction unit configured to perform at least one of an aberration correction and a digital optical correction on the image to generate a corrected image;
a difference calculation unit configured to generate, as an interference image, a difference for each pixel between the image and the corrected image; and
a transmission unit configured to transmit coordinate information contained in the image, the interference image, and the corrected image.

(10) An imaging method, including:
capturing two images that are different from each other by a predetermined amount of an optical distance (focus) between an objective lens and an imaging device; and
transmitting the captured images.

[Supplemental Matters]

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus, comprising:
an imaging unit configured to capture two images that are different from each other by a predetermined amount of an optical distance (focus) between an objective lens and an imaging device having a first resolution;
an angle-of-view adjustment unit configured to equalize angles of view of the two images, one of the two images being a first focus image and the other image being a second focus image;
a diffusion unit configured to generate, as a digital defocused image, an image obtained by diffusing and enlarging the first focus image to have a second resolution higher than the first resolution;
an upsampling unit configured to generate, as an enlarged defocused image, an image obtained by upsampling the second focus image to have the second resolution; and
a difference calculation unit configured to generate, as an interference image, a difference for each pixel between the digital defocused image and the enlarged defocused image; and
a transmission unit configured to transmit the first focus image and the interference image.

2. The imaging apparatus according to claim 1,
wherein the imaging unit includes a formed-image-capturing device configured to capture a formed image on which light passing through the objective lens is focused, and a defocused-image-capturing device configured to capture a defocused image on which the light is defocused based on the predetermined amount.

3. The imaging apparatus according to claim 1, wherein the first focus image is a formed image that is in focus, and the second focus image is a defocused image that is defocused by a predetermined amount from the in-focus position.

4. The imaging apparatus according to claim 3,
wherein the diffusion unit is configured to diffuse the formed image by a point spread function.

5. An imaging apparatus comprising:
an imaging unit configured to capture two images that are different from each other by a predetermined amount of an optical distance (focus) between an objective lens and an imaging device having a first resolution;
an angle-of-view adjustment unit configured to equalize angles of view of the two images, one of the two images being a first focus image and the other image being a second focus image;
a diffusion unit configured to generate, as a digital defocused image, an image obtained by diffusing the first focus image;
a difference calculation unit configured to generate, as an interference image, a difference for each pixel between the digital defocused image and the second focus image; and
a transmission unit configured to transmit the first focus image and the interference image.

6. An imaging apparatus comprising:
an imaging unit configured to capture two images that are different from each other by a predetermined amount of an optical distance (focus) between an objective lens and an imaging device having a first resolution;
an angle-of-view adjustment unit configured to equalize angles of view of the two images, one of the two images being a first focus image and the other image being a second focus image;
a diffusion unit configured to generate, as a first digital defocused image, an image obtained by diffusing the first focus image by a first function and generate, as a second digital defocused image, an image obtained by diffusing the first focus image by a second function, the first function and the second function being linearly symmetrical with each other;
a difference calculation unit configured to generate, as first mask information, a difference for each pixel between the first digital defocused image and the second focus image and generate, as second mask information, a difference for each pixel between the second digital defocused image and the second focus image; and a transmission unit configured to transmit the first focus image, the first mask information, and the second mask information.

7. An imaging apparatus comprising:
an imaging unit configured to capture two images that are different from each other by a predetermined amount of an optical distance (focus) between an objective lens and an imaging device having a first resolution;
an angle-of-view adjustment unit configured to equalize angles of view of the two images, one of the two images being a first focus image and the other image being a second focus image; and
a difference calculation unit configured to generate, as an interference image, a difference for each pixel between the first focus image and the second focus image; and
a transmission unit configured to transmit the first focus image, the second focus image, and the interference image.

8. An imaging apparatus, comprising:
an imaging unit configured to capture an image; a correction unit configured to perform at least one of an aberration correction and a digital optical correction on the image to generate a corrected image;
a difference calculation unit configured to generate, as an interference image, a difference for each pixel between the image and the corrected image; and
a transmission unit configured to transmit coordinate information contained in the image, the interference image, and the corrected image.

9. An imaging method, comprising:
capturing two images that are different from each other by a predetermined amount of an optical distance (focus) between an objective lens and an imaging device;
equalizing angles of view of the two images one of the two images being a first focus image and the other image being a second focus image;
generating, as a digital defocused image, an image obtained by diffusing and enlarging the first focus image to have a second resolution higher than the first resolution;
generating, as an enlarged defocused image, an image obtained by upsampling the second focus image to have the second resolution;
generating, as an interference image, a difference for each pixel between the digital defocused image and the enlarged defocused image; and
transmitting the first focus image and the interference image.

* * * * *